(12) United States Patent
Ichida

(10) Patent No.: US 11,077,855 B2
(45) Date of Patent: Aug. 3, 2021

(54) HUMAN-POWERED VEHICLE CONTROL DEVICE

(71) Applicant: Shimano Inc., Osaka (JP)

(72) Inventor: Tadashi Ichida, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/184,668

(22) Filed: Nov. 8, 2018

(65) Prior Publication Data

US 2019/0143975 A1    May 16, 2019

(30) Foreign Application Priority Data

Nov. 16, 2017 (JP) .............................. JP2017-221366

(51) Int. Cl.
*B60W 30/188* (2012.01)
*B62M 6/45* (2010.01)
(Continued)

(52) U.S. Cl.
CPC .......... *B60W 30/188* (2013.01); *B60W 10/08* (2013.01); *B60W 10/11* (2013.01); *B62M 6/45* (2013.01); *B62M 6/55* (2013.01); *B62M 25/08* (2013.01); *B60W 2300/36* (2013.01); *B60W 2510/1005* (2013.01); *B60W 2710/083* (2013.01); *B60W 2710/1005* (2013.01)

(58) Field of Classification Search
CPC .... B60W 30/188; B60W 10/08; B60W 10/11; B60W 2710/1005; B60W 2300/36; B60W 2510/1005; B60W 2710/083; B62M 6/45; B62M 6/55; B62M 25/08; B62M 6/90
See application file for complete search history.

(56) References Cited

U.S. PATENT DOCUMENTS

2004/0108680 A1*  6/2004  Guderzo ................ B62M 9/122
                                                  280/260
2015/0032340 A1*  1/2015  Lee ........................ F16H 59/044
                                                  701/52
(Continued)

FOREIGN PATENT DOCUMENTS

CN      102464085 A      5/2012
EP      3078583 A1 * 10/2016 .............. B62M 6/45
(Continued)

*Primary Examiner* — Peter D Nolan
*Assistant Examiner* — Ashley L Redhead, Jr.
(74) *Attorney, Agent, or Firm* — Global IP Counselors, LLP

(57) ABSTRACT

A human-powered vehicle control device includes: an input rotary body to which a human driving force is input; a driving wheel driven by rotating the input rotary body; a transmission configured to change a ratio of a rotational speed of the driving wheel to a rotational speed of the input rotary body; a motor that assists in propulsion of the human-powered vehicle; and an electronic controller configured to control the motor. The electronic controller controls the motor in accordance with the human driving force in a case where one of the rotational speed ratio and a transmission stage of the transmission is in a first state, and stops the control of the motor in accordance with the human driving force in a case where one of the rotational speed ratio and the transmission stage is in a second state different from the first state.

16 Claims, 8 Drawing Sheets

(51) Int. Cl.
    *B62M 6/55*     (2010.01)
    *B60W 10/08*     (2006.01)
    *B62M 25/08*     (2006.01)
    *B60W 10/11*     (2012.01)

(56) References Cited

U.S. PATENT DOCUMENTS

| | | |
|---|---|---|
| 2015/0307157 A1 | 10/2015 | Gao |
| 2016/0347411 A1 | 12/2016 | Yamamoto et al. |
| 2017/0008584 A1* | 1/2017 | Butora .................. B62K 25/08 |
| 2017/0106866 A1* | 4/2017 | Schieffelin .............. B62J 99/00 |
| 2017/0259882 A1 | 9/2017 | Gao |
| 2017/0297651 A1 | 10/2017 | Tsuchizawa et al. |
| 2017/0341705 A1 | 11/2017 | Tsuchizawa et al. |

FOREIGN PATENT DOCUMENTS

| | | |
|---|---|---|
| JP | 2000-118481 A | 4/2002 |
| JP | 2015-209159 A | 11/2015 |
| JP | 2017-190100 A | 10/2017 |

\* cited by examiner

HUMAN-POWERED VEHICLE CONTROL DEVICE

CROSS-REFERENCE TO RELATED APPLICATIONS

This application claims priority to Japanese Patent Application No. 2017-221366, filed on Nov. 16, 2017. The entire disclosure of Japanese Patent Application No. 2017-221366 is hereby incorporated herein by reference.

BACKGROUND

Technical Field

The present disclosure generally relates to a human-powered vehicle control device.

Background Information

A human-powered vehicle control device is disclosed in Japanese Laid-Open Patent Publication No. 2016-22798 (patent document 1). In patent document 1, the human-powered vehicle control device controls a motor that assists in propulsion of the human-powered vehicle in a plurality of modes.

SUMMARY

The human-powered vehicle control device can switch between a plurality of modes. However, further improvement in usability is required. One object of the present disclosure is to provide a human-powered vehicle control device that improves usability.

A human-powered vehicle control device in accordance with a first aspect of the present disclosure is for a human-powered vehicle including an input rotary body to which a human driving force is input, a driving wheel driven by rotating the input rotary body, a transmission configured to change a rotational speed ratio of a rotational speed of the driving wheel to a rotational speed of the input rotary body, and a motor that assists in propulsion of the human-powered vehicle. The human-powered vehicle control device comprises an electronic controller configured to control the motor. The electronic controller is configured to control the motor in accordance with the human driving force upon determining one of the rotational speed ratio and a transmission stage of the transmission is in a first state. Further, the electronic controller is configured to stop controlling the motor in accordance with the human driving force upon determining one of the rotational speed ratio and the transmission stage is in a second state different from the first state. In accordance with the first aspect, if one of the rotational speed ratio and the transmission stage has changed between the first state and the second state, the execution and the stopping of the control of the motor in accordance with the human driving force by the electronic controller has changed. Therefore, compared with a case where the change in the rotational speed ratio and the transmission stage and the change in the control of the motor are performed separately, usability is improved.

In accordance with a second aspect of the present disclosure, the human-powered vehicle control device according to the first aspect is configured so that the electronic controller is configured to stop the motor upon determining one of the rotational speed ratio and the transmission stage is in the second state. In accordance with the second aspect, in a case where one of the rotational speed ratio and the transmission stage is in the second state, the motor is stopped. This saves energy.

In accordance with a third aspect of the present disclosure, in the human-powered vehicle control device according to the first or second aspect, the electronic controller is configured to control the transmission. The electronic controller is configured to operate the transmission decreasing an output of the motor upon determining one of the rotational speed ratio and the transmission stage has changed from the first state to the second state. In accordance with the third aspect, in a case where one of the rotational speed ratio and the transmission stage has changed from the first state to the second state, the transmission is operated by decreasing the output of the motor such that shifting is performed in a preferred manner.

In accordance with a fourth aspect of the present disclosure, the human-powered vehicle control device according to any one of the first to third aspects is configured so that the electronic controller is configured to control the motor so that an output torque of the motor is smaller than or equal to a predetermined value over a predetermined period that includes at least part of a period in which the transmission performs a change operation of the ratio and the transmission stage upon determining in at least one of a case in which at least one of the rotational speed ratio and the transmission stage has changed from the first state to the second state, and a case in which at least one of the rotational speed ratio and the transmission stage has changed from the second state to the first state. Further, the predetermined period includes at least part of a period in which the transmission performs a change operation of the rotational speed ratio and the transmission stage. In accordance with the fourth aspect, in at least one of a case in which one of the rotational speed ratio and the transmission stage has changed from the first state to the second state and a case in which one of the rotational speed ratio and the transmission stage has changed from the second state to the first state, the output torque of the motor becomes smaller than or equal to the predetermined value in at least part of the period in which the transmission performs the change operation of the rotational speed ratio and the transmission stage. Therefore, shifting can be performed is a preferred manner.

In accordance with a fifth aspect of the present disclosure, the human-powered vehicle control device according to any one of the first to third aspects is configured so that the electronic controller is configured to control the motor so that the output torque of the motor becomes smaller than or equal to the predetermined value before the shifting by the transmission is completed upon determining in at least one of a case in which at least one of the rotational speed ratio and the transmission stage has changed from the first state to the second state, and a case in which at least one of the rotational speed ratio and the transmission stage has changed from the second state to the first state. In accordance with the fifth aspect, in at least one of a case in which one of the rotational speed ratio and the transmission stage has changed from the first state to the second state and a case in which one of the rotational speed ratio and the transmission stage has changed from the second state to the first state, the output torque of the motor can be smaller than or equal to the predetermined value before the shifting by the transmission is completed. Therefore, shifting is performed in a preferred manner.

In accordance with a sixth aspect of the present disclosure, the human-powered vehicle control device according to any one of the first to fifth aspects further comprises a storage configured to changeably store one of the rotational speed ratio and the transmission stage corresponding to the first state and one of the rotational speed ratio and the transmission stage corresponding to the second state. The electronic controller is further configured to control the motor in accordance with the first state and the second state stored in the storage. In accordance with the sixth aspect, one of the rotational speed ratio and the transmission stage corresponding to the first state and one of the rotational speed ratio and the transmission stage corresponding to the second state can be changed. This improves usability.

In accordance with a seventh aspect of the present disclosure, the human-powered vehicle control device according to any one of the first to sixth aspects is configured so that the transmission includes a front derailleur. In accordance with the seventh aspect, the shifting by the front derailleur and the change in the execution and the stopping of the control of the motor in accordance with the human driving force can be performed simultaneously.

In accordance with an eighth aspect of the present disclosure, the human-powered vehicle control device according to any one of the first to seventh aspects further comprises a detector configured to detect one of the rotational speed ratio and the transmission stage corresponding to the first state. In accordance with the eighth aspect, the detector can detect the completion of the shifting by the transmission.

A human-powered vehicle control device in accordance with a ninth aspect of the present disclosure is for a human-powered vehicle including a human-powered vehicle component, which is changed to a plurality of states, and a motor, which assists in propulsion of the human-powered vehicle. The human-powered vehicle control device comprises an electronic controller configured to control the motor. The electronic controller is configured to switch a first control state in which the motor is controlled in accordance with a human driving force input to the human-powered vehicle and a second control state in which control of the motor is stopped in accordance with the human driving force. The electronic controller is configured to switch the first control state and the second control state in accordance with the state of the human-powered vehicle component. In accordance with the ninth aspect, the first control state and the second control state can be changed in accordance with the state of the human-powered vehicle component. Therefore, compared with a state in which the state of the human-powered vehicle component and the first control state and second control state are changed separately, usability is improved.

In accordance with a tenth aspect of the present disclosure, the human-powered vehicle control device according to the ninth aspect further comprises a storage configured to changeably store combinations of each of the plurality of states of the human-powered vehicle component with the first control state or the second control state. The electronic controller is further configured to be operated in the first control state or the second control state combined with one of the plurality of states of the human-powered vehicle component stored in the storage. In accordance with the tenth aspect, the combinations of the state of the human-powered vehicle component with the first control state and the second control state can be changed. This improves usability.

A human-powered vehicle control device in accordance with an eleventh aspect of the present disclosure is for a human-powered vehicle including a human-powered vehicle component, which is changed to a plurality of states, and a motor, which assists in propulsion of the human-powered vehicle including the human-powered vehicle component. The human-powered vehicle control device comprises an electronic controller and a storage. The electronic controller is configured to control the human-powered vehicle component and the motor. The electronic controller is configured to switch a first control state in which the motor is controlled in accordance with a human driving force input to the human-powered vehicle and a second control state in which a control of the motor in accordance with the human driving force is stopped. The storage is configured to changeably store combinations of each of the plurality of states of the human-powered vehicle component with the first control state or the second control state. The electronic controller is configured to select one of the combinations in accordance with an operation of an operating device, control the human-powered vehicle component so that the human-powered vehicle component is in a state of the selected combination, and so that the human-powered vehicle component is operated in the first control state or the second control state in the selected combination. In accordance with the eleventh aspect, the state of the human-powered vehicle component with the first control state or the second control state can be changed to be a combination determined in advance in accordance with the operation of the operating device. This improves usability.

In accordance with a twelfth aspect of the present disclosure, the human-powered vehicle control device according to the eleventh aspect is configured so that the electronic controller is configured to select the combinations in accordance with an order determined in advance whenever the operating device is operated. In accordance with the twelfth aspect, since the combination of the state of the human-powered vehicle component with the first control state or the second control state has changed in accordance with the order determined in advance by allowing a user to operate the operating device, the state of the human-powered vehicle component, the first control state, and the second control state can be easily changed with a single operating device.

In accordance with a thirteenth aspect of the present disclosure, the human-powered vehicle control device according to the twelfth aspect is configured so that the operating device includes a plurality of operating units, the storage stores each of the plurality of operating units and the combinations in correspondence with each other, and the electronic controller selects the combinations corresponding to the operating units operated upon determining the operating device is operated. In accordance with the thirteenth aspect, the user can simply change the combination of the state of the human-powered vehicle component with the first control state or the second control state to the desired combination by operating each of the plurality of operating units.

In accordance with a fourteenth aspect of the present disclosure, the human-powered vehicle control device according to any one of the ninth to thirteenth aspects is configured so that the human-powered vehicle component includes a transmission configured to change a rotational speed ratio of a rotational speed of a driving wheel driven by rotating an input rotary body to a rotational speed of the input rotary body input to which the human driving force is input, and a transmission stage of the transmission differs in the plurality of states. In accordance with the fourteenth aspect, it is possible to change the combination of the transmission stage of the transmission with the first control state or the second control state.

In accordance with a fifteenth aspect of the present disclosure, the human-powered vehicle control device according to any one of the ninth to fourteenth aspects is configured so that the human-powered vehicle component includes a seatpost of the human-powered vehicle, and a height of the seatpost differs in the plurality of states. In accordance with the fifteenth aspect, it is possible to change the combination of the height of the seatpost with the first control state or the second control state.

In accordance with a sixteenth aspect of the present disclosure, the human-powered vehicle control device according to any one of the ninth to fifteenth aspects is configured so that the human-powered vehicle component includes a suspension of the human-powered vehicle, and at least one of a hardness, damping factor, and length of the suspension differs in the plurality of states. In accordance with the sixteenth aspect, it is possible to change the combination of at least one of the hardness, dampening factor, and length of the suspension with the first control state or the second control state.

The human-powered vehicle control device in accordance with the present disclosure can contribute to the usability.

BRIEF DESCRIPTION OF THE DRAWINGS

Referring now to the attached drawings which form a part of this original disclosure.

DETAILED DESCRIPTION OF EMBODIMENTS

Figure 1:
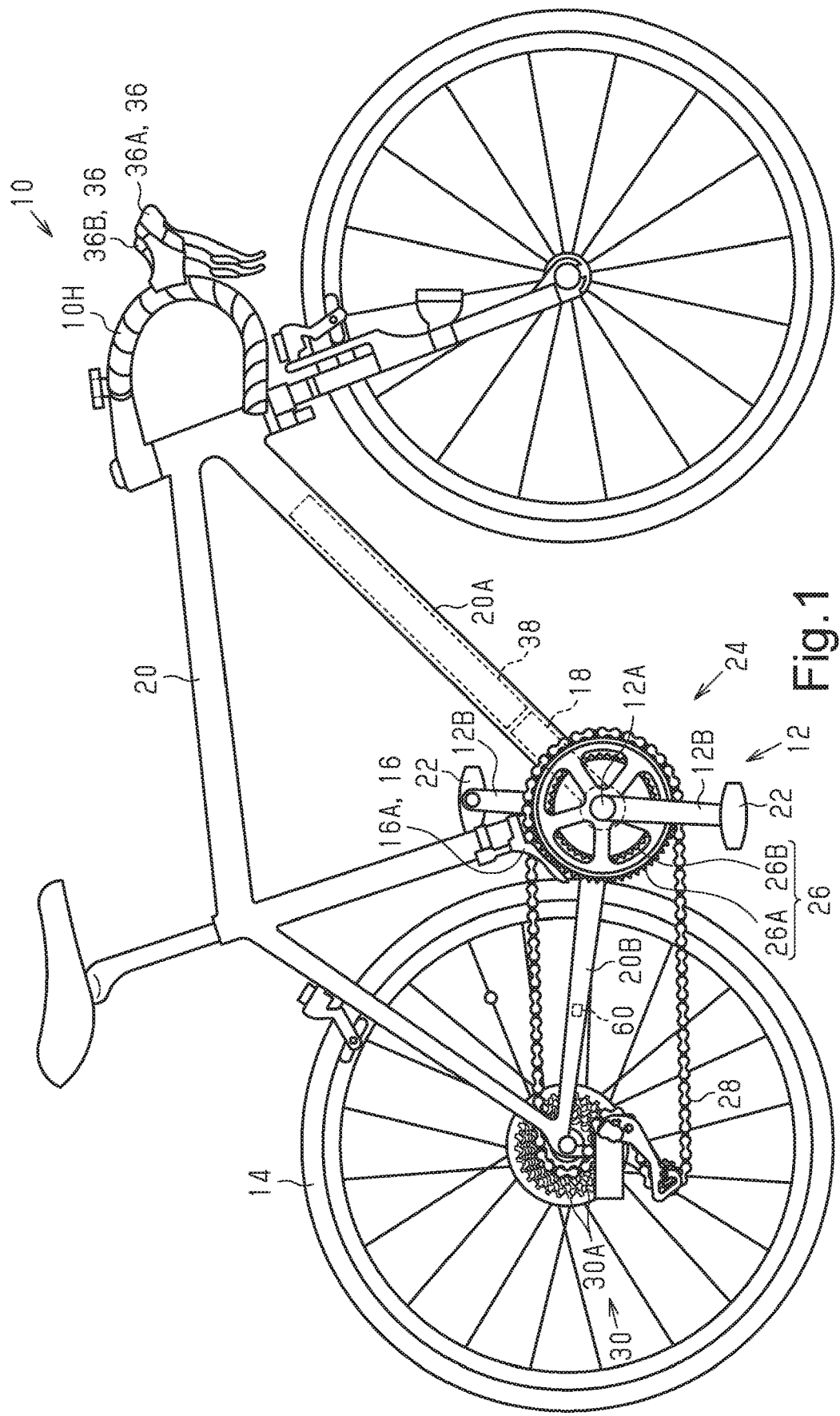
FIG. 1 is a side elevational view of a human-powered vehicle including a human-powered vehicle control device in accordance with a first embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents. In this following description, the phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

First Embodiment

A human-powered vehicle control device 50 in accordance with an embodiment will be described with reference to FIG. 1. Hereinafter, the human-powered vehicle control device will be described simply as a control device. The control device 50 is provided on a human-powered vehicle 10. The human-powered vehicle 10 is a vehicle that can be driven by at least human driving force. The human-powered vehicle 10 includes, for example, a bicycle. The human-powered vehicle 10 also includes, for example, a vehicle having a monocycle and three or more wheels irrespective of the number of wheels. Examples of a bicycle can include a mountain bike, a road bike, a city bike, a cargo bike, and a recumbent type bicycle. Hereinafter, in the embodiments below, the human-powered vehicle 10 will be described as a bicycle.

The human-powered vehicle 10 includes an input rotary body 12, a driving wheel 14, a transmission 16, and a motor 18. The human-powered vehicle 10 further includes a frame 20. Human driving force is input to the input rotary body 12. The input rotary body 12 includes a crank. The input rotary body 12 includes a crankshaft 12A rotatable relative to the frame 20 and a pair of crank arms 12B respectively provided on both axial ends of the crankshaft 12A. The crank arms 12B are each connected to a pedal 22. The driving wheel 14 is driven by rotating the input rotary body 12. The driving wheel 14 is supported by the frame 20. The input rotary body 12 and the driving wheel 14 are connected to each other by a driving mechanism 24. The driving mechanism 24 includes a first rotary body 26 coupled to the crankshaft 12A. The crankshaft 12A and the first rotary body 26 can be coupled to each other via a first one-way clutch. The first one-way clutch is configured to rotate the first rotary body 26 forward in a case where the input rotary body 12 is rotated forward and is configured not to rotate the first rotary body 26 backward in a case where the input rotary body 12 is rotated backward. The first rotary body 26 includes a sprocket, a pulley, or a bevel gear. The driving mechanism 24 further includes a connection member 28 and a second rotary body 30. The connection member 28 transmits a rotating force of the first rotary body 26 to the second rotary body 30. The connection member 28 includes, for example, a chain, a belt, or a shaft.

The second rotary body 30 is connected to the driving wheel 14. The second rotary body 30 includes a sprocket, a pulley, or a bevel gear. It is preferable that a second one-way clutch be provided between the second rotary body 30 and the driving wheel 14. The second one-way clutch is configured to rotate the driving wheel 14 forward in a case where the second rotary body 30 is rotated forward, and is configured not to rotate the driving wheel 14 backward in a case where the second rotary body 30 is rotated backward.

The human-powered vehicle 10 includes a front wheel and a rear wheel. The front wheel is attached to the frame 20 by a front fork. A handlebar 10H is connected to the front fork via a stem. In the following embodiments, the rear wheel will be described as the driving wheel 14. However, the front wheel can be the driving wheel 14.

Figure 2:
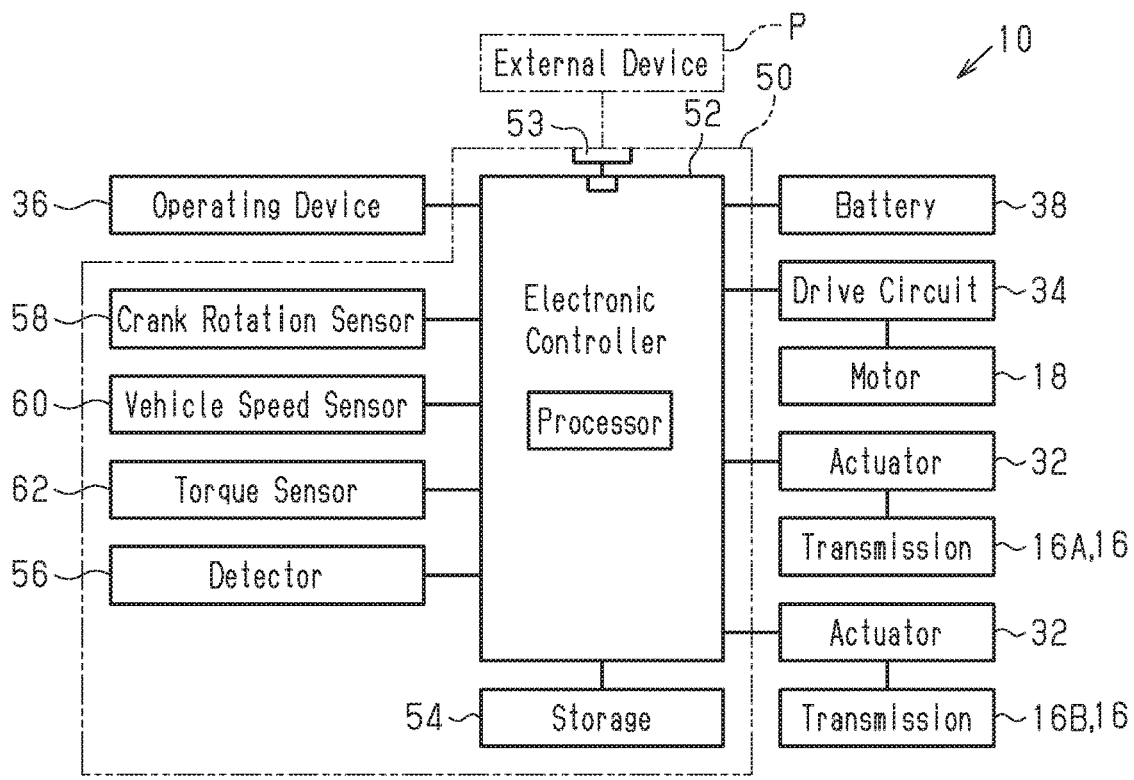
FIG. 2 is a block diagram showing an electrical configuration of the human-powered vehicle control device in accordance with the first embodiment.

As shown in FIG. 2, the human-powered vehicle 10 further includes a drive circuit 34 of the motor 18, an actuator 32 of the transmission 16, an operating device 36, a battery 38, and the control device 50.

The motor 18 and the drive circuit 34 are preferably provided in the same housing. The drive circuit 34 controls electric power supplied from the battery 38 to the motor 18. The drive circuit 34 is connected to an electronic controller 52 of the control device 50 so as to communicate with the electronic controller 52 of the control device 50 through wired or wireless connection. The electronic controller 52 will hereafter be referred to simply as the controller 52. The drive circuit 34 can communicate with the controller 52, for example, through serial communication. The drive circuit 34 drives the motor 18 in response to a control signal from the controller 52. The drive circuit 34 can be included in the control device 50 or can be included in the controller 52. The motor 18 assists propulsion of the human-powered vehicle 10. The motor 18 includes an electric motor. The motor 18 is configured to transmit rotation to the front wheel or a transfer path of a human driving force from the pedals 22 to the rear wheel. The motor 18 is provided on the frame 20, the rear wheel, or the front wheel of the human-powered vehicle 10. In one example, the motor 18 is coupled to a power transmission path from the crankshaft 12A to the first rotary body 26. It is preferable that the power transmission path between the motor 18 and the crankshaft 12A be provided with the one-way switch so that the motor 18 is not rotated by the rotating force of the input rotary body 12 in a case where the human-powered vehicle 10 rotates the crankshaft 12A in a forward direction. The housing provided with the motor 18 and the drive circuit 34 can be provided with components other than the motor 18 and the drive circuit 34, for example, a reduction gear that decelerates and outputs the rotation of the motor 18.

In the human-powered vehicle 10 shown in FIG. 1, the motor 18 is coupled to the power transmission path from the crankshaft 12A to the first rotary body 26. At least part of the motor 18 can also be housed in a down tube 20A of the frame 20. It is preferable that the crankshaft 12A be provided on the same housing as the motor 18. A rotation axis of the motor 18 can correspond to an extending direction of the down tube 20A of the frame 20. In this case, a mechanism for converting a rotation direction can be provided between the motor 18 and the power transmission path from the crankshaft 12A to the first rotary body 26.

The transmission 16 is configured to change a rotational speed ratio R of a rotational speed of the driving wheel 14 to a rotational speed of the input rotary body 12. The transmission 16 is configured to change the rotational speed ratio R of the human-powered vehicle 10. The transmission 16 is configured to change the rotational speed ratio R in a stepped manner. The actuator 32 causes the transmission 16 to perform a shifting operation. The transmission 16 is controlled by the controller 52. The actuator 32 is connected to the controller 52 so as to communicate with the controller 52 through wired or wireless connection. The actuator 32 can communicate with the controller 52, for example, through power line communication (PLC). The actuator 32 causes the transmission 16 to perform the shifting operation in response to the control signal from the controller 52. The transmission 16 includes at least one of an internal transmission and an external transmission (derailleur). The transmission is configured to switch a transmission stage S.

In the human-powered vehicle 10 shown in FIG. 1, the transmission 16 includes a front derailleur 16A (first transmission) and a rear derailleur 16B (second transmission). The first rotary body 26 includes a first sprocket 26A and a second sprocket 26B having a smaller diameter than that of the first sprocket 26A. The front derailleur 16A is configured to switch between a first transmission stage SF1 using the first sprocket 26A and a second transmission stage SF2 using the second sprocket 26B. The second rotary body 30 includes a plurality of rear sprockets 30A. The rear derailleur 16B is configured to switch the transmission stage SR by replacing the connection member 28 between the plurality of rear sprockets 30A. The transmission 16 can include only one of the front derailleur 16A and the rear derailleur 16B.

The operating device 36 is provided on the human-powered vehicle 10. The operating device 36 includes a first operating device 36A and a second operating device 36B. The operating device 36 is configured to be operable by a user. The operating device 36 is configured to change at least one of the rotational speed ratio R and the control state of the controller 52 related to the motor 18.

Figure 3:
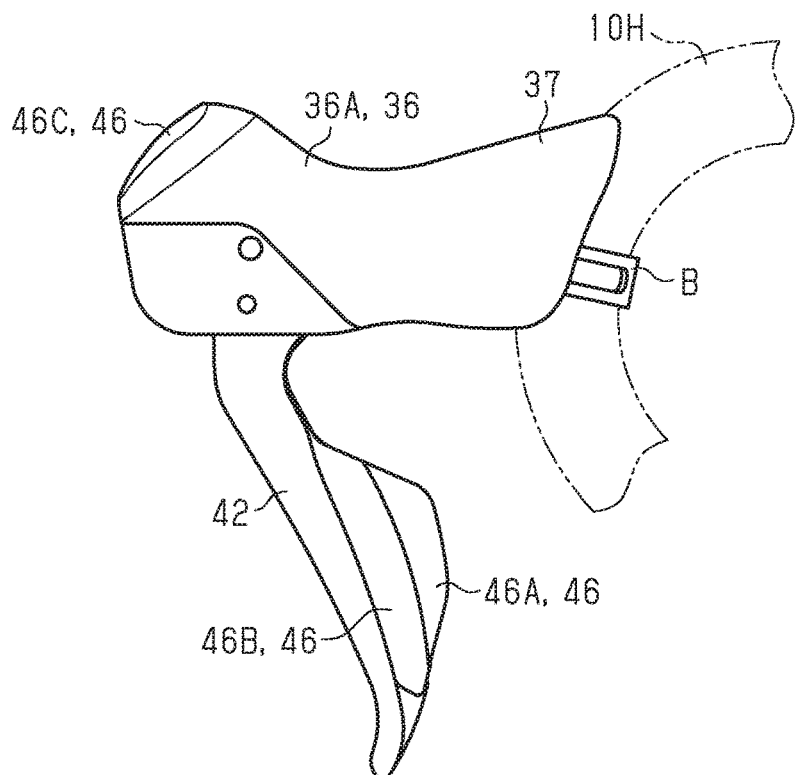
FIG. 3 is a side elevational view of an operating device of FIG. 2 as viewed from an outside in a vehicle width direction.

As shown in FIG. 3, the operating device 36 is attached to the handlebar 10H of the human-powered vehicle 10. The operating device 36 is connected to the controller 52 so as to communicate with the controller 52 through wired or wireless connection. The operating device 36 is configured to communicate with the controller 52, for example, through PLC. The handlebar 10H is formed by, for example, a drop handlebar. The operating device 36 includes the first operating device 36A provided on a first end of the handlebar 10H and the second operating device 36B provided on a second end of the left handlebar 10H in a widthwise direction of the human-powered vehicle 10. The first end of the handlebar 10H is an end on a left side in a traveling direction of the human-powered vehicle 10. The second end of the handlebar 10H is an end on a right side in the traveling direction of the human-powered vehicle 10. The first operating device 36A and the second operating device 36B each include, for example, an operating unit 46, a sensor detecting a movement of the operating unit 46, and an electric circuit communicating with the controller 52 in response to an output signal of the sensor. The operating device 36 includes, for example, the operating unit 46, the sensor detecting the movement of the operating unit 46, and the electric circuit communicating with the controller 52 in response to the output signal of the sensor. The operating unit 46 is operated by a user, and thus the operating device 36 transmits the output signal to the controller 52. The operating unit 46 is configured to include a push switch, a lever type switch, or a touch panel. The operating device 36 can include a plurality of operating units 46. In the first embodiment, the operating unit 46 includes a first operating unit 46A and a second operating unit 46B. The first operating device 36A and the second operating device 36B each include a base portion 37 having one end that is attachable to the handlebar 10H. The one end of the base portion 37 is fixed to the handlebar 10H by a fixing band B. The base portion 37 is configured to be able to be held by a rider. The other end of the base portion 37 is provided with a brake lever 42 controlling a brake. The brake lever 42 is attached to the other end of the base portion 37 pivotally relative to the base portion 37. The brake lever 42 can be configured to control a brake device via the Bowden cable or can be configured to control the brake device with hydraulic pressure via a brake hose. In a case where the brake lever 42 controls the brake device by the hydraulic pressure, it is preferable that the base portion 37 be provided with a hydraulic piston. For example, the brake device of the front wheel is operated by the brake lever 42 of the first operating device 36A, and the brake device of the rear wheel is operated by the brake lever 42 of the second operating device 36B.

The first operating unit 46A and the second operating unit 46B are provided, for example, on the brake lever 42. It is preferable that the first operating unit 46A and the second operating unit 46B be provided on an end of the brake lever 42 at the side toward the handlebar 10H.

The output signal transmitted from the operating device 36 to the controller 52 differs corresponding to each operating unit 46. The output signal transmitted to the controller 52 in a case where each of the first operating unit 46A and the second operating unit 46B of the first operating device 36A is operated differs from the output signal transmitted to the controller 52 in a case where each of the first operating unit 46A and the second operating unit 46B of the second operating device 36B is operated.

In the first embodiment, the first operating device 36A is used for operating the rear derailleur 16B. If one of the first operating unit 46A and the second operating unit 46B of the first operating device 36A is operated, the controller 52 changes a transmission stage SR of the rear derailleur 16B so that the rotational speed ratio R is increased. If the other of the first operating unit 46A and the second operating unit 46B of the first operating device 36A is operated, the controller 52 changes the transmission stage SR of the rear derailleur 16B so that the rotational speed ratio R is decreased.

In the first embodiment, the second operating device 36B is used for operating the front derailleur 16A. The first operating unit 46A of the second operating device 36B is used to change the transmission stage SF of the front derailleur 16A from the second transmission stage SF2 to the first transmission stage SF1. The second operating unit 46B of the second operating device 36B is used to change the transmission stage SF of the front derailleur 16A from the first transmission stage SF1 to the second transmission stage SF2.

A storage 54 stores information related to a combination of the operating unit 46 of the operating device 36 with the operation of the transmission 16. The information can be changed. Table 1 shows an example of the information related to the combination of the operating unit 46 of the operating device 36 with the operation of the transmission 16. The combination of the operating unit 46 of the operating device 36 with the operation of the transmission 16 can be changed by an external device P.

TABLE 1

| Operating unit | Operation of transmission |
| --- | --- |
| First operating unit of first operating device | Shift up of rear derailleur |
| Second operating unit of first operating device | Shift down of rear derailleur |
| First operating unit of second operating device | Shift up of front derailleur |
| Second operating unit of second operating device | Shift down of front derailleur |

The external device P includes portable information devices such as a personal computer, a tablet type computer, a cycle computer, and a smart phone. The control device 50 includes an interface portion 53. The interface portion 53 includes at least one of a wired communication unit for connecting an electric cable connected to the external device P and a wireless communicator for communicating with the external device P wirelessly. The controller 52 is electrically connected to the interface portion 53, and changes the information stored in the storage 54 in response to an input signal from the external device P received via the interface portion 53. For example, the first operating device 36A can be used for operating the front derailleur 16A and the second operating device 36B can be used for operating the rear derailleur 16B.

The operating device 36 can include an operating unit configured to control only the transmission 16. In the first embodiment, for example, the first operating unit 46A and the second operating unit 46B of the first operating device 36A are used to operate the transmission 16.

The operating device 36 can further include a third operating unit 46C. The third operating unit 46C is provided, for example, on the second end of the base portion 37 of one of the first operating device 36A and the second operating device 36B. The third operating unit 46C can be provided on another part of the base portion 37, provided on the brake lever 42, or provided in plural respectively on each of the first operating device 36A and the second operating device 36B. The third operating unit 46C is used, for example, to change only the control state of the controller 52 related to the motor 18. If the third operating unit 46C of the second operating device 36B is operated, the controller 52 changes the control state of the controller 52 related to the motor 18 so that at least one of the ratio of the output of the motor 18 to the human driving force and the maximum output of the motor 18 is increased by one stage. If the third operating unit 46C of the first operating device 36A is operated, then the controller 52 changes the control state of the controller 52 related to the motor 18 so that the output of at least one of the ratio of the output of the motor 18 to the human driving force and the maximum output of the motor 18 is decreased by one stage.

In the first embodiment, for example, the first operating unit 46A and the second operating unit 46B of the second operating device 36B are used for operating the transmission 16 and changing the control state of the controller 52 related to the motor 18.

The battery 38 shown in FIG. 2 includes one or more battery cells. The battery cell includes a rechargeable battery. The battery 38 is provided on the human-powered vehicle 10 and supplies electric power to other electrical components, such as the motor 18, the actuator 32, and the control device 50, which are electrically connected to the battery 38 in a wired manner. The battery 38 is connected to the controller 52 so as to communicate with the controller 52 through wired or wireless connection. The battery 38 is configured to communicate with the controller 52, for example, by the PLC. The battery 38 can be attached to the outside of the frame 20 or at least partially accommodated in the frame 20.

In the human-powered vehicle 10 shown in FIG. 1, the battery 38 is accommodated in the frame 20. In this case, the battery 38 can be accommodated in the down tube 20A of the frame 20. In a case where the motor 18 and the battery 38 are accommodated in the frame 20, terminals capable of being electrically connected with each other can be provided in the housing provided with the motor 18 and the battery 38.

The control device 50 includes the controller 52. In one example, the control device 50 further includes the storage 54. The control device 50 further includes a detector 56, a crank rotation sensor 58, a vehicle speed sensor 60, and a torque sensor 62.

The controller 52 includes an arithmetic processing unit that executes predetermined control programs. The arithmetic processing unit includes, for example, a central processing unit (CPU) or a micro processing unit (MPU) that includes one or more processors. The controller 52 can include one or more microcomputers. The controller 32 can be formed of one or more semiconductor chips that are mounted on a printed circuit board. The term "electronic controller" or "controller" as used herein refers to hardware that executes a software program. The storage 54 (memory) stores various control programs and information used for various control processes. The storage 54 is any computer storage device or any computer readable medium with the sole exception of a transitory, propagating signal. The storage 54 includes, for example, a non-volatile memory device and a volatile memory device. The controller 52 and the storage 54 are provided, for example, in the housing provided with the motor 18. The motor 18 and the housing form part of a drive unit. The controller 52 can be provided in the human-powered vehicle 10 in a case where the controller 52 is divided into a plurality of parts and the divided parts are separated from each other. For example, part of the controller 52 can be provided in the drive unit and another part of the controller 52 can be provided in the transmission 16.

The detector 56 detects one of the rotational speed ratio R and the transmission stage S. In the first embodiment, the detector 56 detects the transmission stage S. In one example, the detector 56 detects the posture of the front derailleur 16A. The front derailleur 16A includes the base portion fixed to the frame 20, a moving portion movable with respect to the base portion, and a link portion connected to the base portion and the moving portion. The moving portion includes a guide portion guiding a chain. The posture of the front derailleur 16A includes a position of the guide portion of the front derailleur 16A. The actuator 32 of the front derailleur 16A includes the electric motor and the reduction gear. The actuator 32 can move the position of the guide portion by rotating the electric motor. The detector 56 detects the position of the guide portion, for example, by detecting a rotation state of a rotation member included in the reduction gear. The detector 56 includes, for example, a magnet and a magnetic field sensor, a potentiometer or the like. The detector 56 can include a unit that performs wireless or wired communication. The communication unit is configured to communicate with the controller 52.

The crank rotation sensor 58 detects the rotational speed of the input rotary body 12. The crank rotation sensor 58 is attached to the housing provided with the frame 20 or the motor 18 of the human-powered vehicle 10. The crank rotation sensor 58 includes a magnetic sensor outputting a signal corresponding to the intensity of a magnetic field. An annular magnet of which magnetic field intensity varies in a circumferential direction is provided on the crankshaft 12A or the power transmission path between the crankshaft 12A and the first rotary body 26. The crank rotation sensor 58 is connected to the controller 52 so as to communicate with the controller 52 through wired or wireless connection. The crank rotation sensor 58 outputs the signal corresponding to the rotational speed of the input rotary body 12 to the controller 52.

The crank rotation sensor 58 can be provided on a member that is integrally rotated with the crankshaft 12A in the transmission path of the human driving force from the crankshaft 12A to the first rotary body 26. For example, the crank rotation sensor 58 can be provided on the first rotary body 26 in a case where the one-way clutch is not provided between the crankshaft 12A and the first rotary body 26.

The vehicle speed sensor 60 detects the rotational speed of the wheel. The vehicle speed sensor 60 is electrically connected to the controller 52 through wired or wireless connection. The vehicle speed sensor 60 is attached to a chain stay 20B of the frame 20. The vehicle speed sensor 60 is connected to the controller 52 so as to communicate with the controller 52 through wired or wireless connection. The vehicle speed sensor 60 outputs the signal corresponding to the rotational speed of the wheel to the controller 52. The controller 52 calculates a vehicle speed V of the human-powered vehicle 10 based on the rotational speed of the wheel. The controller 52 stops the motor 18 upon determining the vehicle speed V is larger than or equal to the predetermined value. The predetermined value is, for example, 25 Km per hour or 45 Km per hour. It is preferable that the vehicle speed sensor 60 include a magnetic lead forming a reed switch or a Hall element. The vehicle speed sensor 60 can be configured to be provided on the front fork and detect the magnet attached to the front wheel.

The torque sensor 62 is provided on the housing provided with the motor 18. The torque sensor 62 detects the human driving force input to the input rotary body 12. The torque sensor 62 is provided, for example, above a first one-way clutch in the power transmission path. The torque sensor 62 includes a strain sensor, a magnetostrictive sensor, or the like. The strain sensor includes a strain gauge. In a case where the torque sensor 62 includes the strain sensor, the strain sensor is provided on the outer circumference of the rotary body included in the power transmission path. The torque sensor 62 can include a communication unit that performs wireless or wired communication. The communication unit of the torque sensor 62 is configured to communicate with the controller 52.

The controller 52 is operatively coupled to the motor 18, and is configured to control the motor 18. The controller 52 is configured to switch a first control state in which the motor 18 is controlled in accordance with the human driving force TA input to the human-powered vehicle 10 and a second control state in which the control of the motor 18 in accordance with the human driving force TA is stopped. In the first control state, the controller 52 can be further configured to switch a plurality of control states having different output characteristics of the motor 18 with respect to the human driving force TA. The output characteristic of the motor 18 includes at least one of the ratio of the output of the motor 18 to the human driving force TA and the maximum output of the motor 18. The at least one of the ratio of the output of the motor 18 to the human driving force TA and the maximum output of the motor 18 includes only the ratio of the output of the motor 18 to the human driving force TA, only the maximum output of the motor 18, or both the ratio of the output of the motor 18 to the human driving force TA and the maximum output of the motor 18. In a case where the output of the motor 18 is input to the manual driving path via the reduction gear, the output of the reduction gear is set as the output of the motor 18. The human driving force TA can be a value of the torque output from the torque sensor 62 or a value of power obtained by multiplying the rotational speed output from the crank rotation sensor 58 by the torque output from the torque sensor 62. Therefore, the ratio of the output of the motor 18 to the human driving force TA is the ratio of the output torque value of the motor 18 to the torque value of the human driving force TA or the ratio of the power (watt) of the output of the motor 18 to the power (watt) of the human driving force input to the human-powered vehicle 10. The controller 52 controls the output of the motor 18 so that the ratio of the output of the motor 18 to the human driving force TA is, for example, 1:RT in the first control state. The RT is preferably a value of larger than or equal to 0.3 and smaller than or equal to 4. The controller 52 controls the output of the motor 18 so that the maximum output of the motor 18 is smaller than or equal to 300 watts in the first control state. The ratio of the output of the motor 18 to the human driving force TA in the first control state and the information on the maximum output of the motor 18 are changeably stored in the storage 54. In the first control state, at least one of the ratio of the output of the motor 18 to the human driving force TA and the maximum output of the motor 18 can be changed by the external device P.

The controller 52 acquires at least one of the information on the transmission stage S and the information on the rotational speed ratio R. The at least one of the information on the transmission stage S and the information on the rotational speed ratio R includes only the information on the transmission stage S, only the information on the rotational speed ratio R, or both the information on the transmission stage S and the information on the rotational speed ratio R. In the first embodiment, the detector 56 detects the transmission stage S. The controller 52 acquires information on the transmission stage S of the transmission 16 from the output from the detector 56. The controller 52 can determine whether the shifting by the transmission 16 is completed from the acquired information on the transmission stage S.

The controller 52 controls the motor 18 according to one of the rotational speed ratio R and the transmission stage S of the transmission 16. The controller 52 controls the motor 18 in accordance with the human driving force TA in a case where one of the rotational speed ratio R and the transmission stage S of the transmission 16 is the first state. In the first embodiment, the controller 52 is operated in the first control state in a case where the transmission stage S of the front derailleur 16A is in the first state to control the motor 18 in accordance with the human driving force TA.

The controller 52 stops the control of the motor 18 in accordance with the human driving force TA in a case where one of the rotational speed ratio R and the transmission stage S is in the second state different from the first state. In a case where one of the rotational speed ratio R and the transmission stage S is in the second state, it is preferable that the controller 52 stop the motor 18. In the first embodiment, the controller 52 is operated in the second control state in a case where the transmission stage S of the front derailleur 16A is in the second state to stop the control of the motor 18 in accordance with the human driving force TA.

The controller 52 controls the transmission 16. The controller 52 controls the actuator 32 to change the posture of the front derailleur 16A and switches the transmission stage S between the first transmission stage SF1 and the second transmission stage SF2. The controller 52 changes the posture of the front derailleur 16A to switch the transmission stage S between the first transmission stage SF1 and the second transmission stage SF2 thereby switching the rotational speed ratio R between the first ratio R1 and the second ratio R2. The controller 52 controls the actuator 32 to change the posture of the rear derailleur 16B thereby switching the transmission stage SR. The controller 52 changes the posture of the rear derailleur 16B to switch the transmission stage SR thereby switching the rotational speed ratio R.

It is preferable that the storage 54 store one of the rotational speed ratio R and the transmission stage S corresponding to the first state and one of the rotational speed ratio R and the transmission stage S corresponding to the second state in a changeable manner. The storage 54 changeably stores one of the rotational speed ratio R and the transmission stage S corresponding to the first state and one of the rotational speed ratio R and the transmission stage S corresponding to the second state, which are stored in the storage 54, by the external device.

Tables 2 and 3 show examples of the transmission stage S corresponding to the first state and the transmission stage S corresponding to the second state which are stored in the storage 54. In Table 2, the first state corresponds to the second transmission stage SF2, and the second state corresponds to the first transmission stage SF1. In a case where the information of Table 2 is stored in the storage 54, the controller 52 is in the first control state in a case where the transmission stage S is the second transmission stage SF2, and is in the second control state in a case where the transmission stage S is the first transmission stage SF1. In Table 3, the first state corresponds to the first transmission stage SF1, and the second state corresponds to the second transmission stage SF2. In a case where the information of Table 3 is stored in the storage 54, the controller 52 is in the second control state in a case where the transmission stage S is the second transmission stage SF2, and is in the first control state in a case where the transmission stage S is the first transmission stage SF1.

TABLE 2

| | |
|---|---|
| First state | Second transmission stage SF2 |
| Second state | First transmission stage SF1 |

TABLE 3

| | |
|---|---|
| First state | First transmission stage SF1 |
| Second state | Second transmission stage SF2 |

In a case where the operating device 36 is operated to change the transmission stage S of the transmission 16, the controller 52 can be in the first control state or the second control state determined in advance in accordance with the state of the transmission 16. Therefore, the user does not need to separately perform the operation of changing the transmission stage S and the operation of changing the first control state and the second control state.

Second Embodiment

In the first embodiment, the controller 52 does not change the control state of the controller 52 related to the motor 18 according to the transmission stage SF of the front derailleur 16A but instead can be configured to change the control state of the controller 52 related to the motor 18 according to the transmission stage SR of the rear derailleur 16B. In the second embodiment, for example, a first operating unit 46A and a second operating unit 46B of a second operating device 36B are used for operating a transmission 16. In the second embodiment, for example, the first operating unit 46A and the second operating unit 46B of a first operating device 36A are used for operating the transmission 16 and changing the control state of the controller 52 related to the motor 18. In the second embodiment, the front derailleur 16A can be omitted.

The second rotary body 30 includes, for example, eleven rear sprockets 30A. The second rotary body 30 includes a first sprocket 30A, a second sprocket 30A having a smaller diameter than that of the first sprocket 30A, a third sprocket 30A having a smaller diameter than that of the second sprocket 30A, a fourth sprocket 30A having a smaller diameter than that of the third sprocket 30A, a fifth sprocket 30A having a smaller diameter than that of the fourth sprocket 30A, a sixth sprocket 30A having a smaller diameter than that of the fifth sprocket 30A, a seventh sprocket 30A having a smaller diameter than that of the sixth sprocket 30A, an eighth sprocket 30A having a smaller diameter than that of the seventh sprocket 30A, a ninth sprocket 30A having a smaller diameter than that of the eighth sprocket 30A, a tenth sprocket 30A having a smaller diameter than that of the ninth sprocket 30A, an eleventh sprocket 30A having a smaller diameter than that of the tenth sprocket 30A, and a twelfth sprocket 30A having a smaller diameter than that of the eleventh sprocket 30A.

The rear derailleur 16B is configured to switch a first transmission stage SR1 using the first sprocket 30A, a second transmission stage SR2 using the second sprocket 30A, a third transmission stage SR3 using the third sprocket 30A, a fourth transmission stage SR4 using the fourth sprocket 30A, a fifth transmission stage SR5 using the fifth sprocket 30A, a sixth transmission stage SR6 using the sixth sprocket 30A, a seventh transmission stage SR7 using the seventh sprocket 30A, an eighth transmission stage SR8 using the eighth sprocket 30A, a ninth transmission stage SR9 using the ninth sprocket 30A, a tenth transmission stage SR10 using the tenth sprocket 30A, an eleventh transmission stage SR11 using the eleventh sprocket 30A, and a twelfth transmission stage SR12 using the twelfth sprocket 30A.

Table 4 shows examples of the transmission stage SR corresponding to a first state and the transmission stage SR corresponding to a second state which are stored in the storage 54. It is preferable that the storage 54 changeably store the transmission stage SR corresponding to the first state and the transmission stage SR corresponding to the second state. The transmission stage SR corresponding to the first state and the transmission stage SR corresponding to the second state can be changed by an external device. In a case where the information of Table 4 is stored in the storage 54, the controller 52 is in the first control state in a case where the transmission stage is any one of the first to seventh transmission stages SR1 to SR7, and is in the second control state in a case where the transmission stage is any one of the eighth to twelfth transmission stages SR8 to SR12.

TABLE 4

| First state | First transmission stage SR1 |
| | Second transmission stage SR2 |
| | Third transmission stage SR3 |
| | Fourth transmission stage SR4 |
| | Fifth transmission stage SR5 |
| | Sixth transmission stage SR6 |
| | Seventh transmission stage SR7 |
| Second state | Eighth transmission stage SR8 |
| | Ninth transmission stage SR9 |
| | Tenth transmission stage SR10 |
| | Eleventh transmission stage SR11 |
| | Twelfth transmission stage SR12 |

Third Embodiment

In the first embodiment, the controller 52 can be configured to change the control state according to both the transmission stage S of the front derailleur 16A and the transmission stage S of the rear derailleur 16B. For example, the first operating unit 46A and the second operating unit 46B of the first operating device 36A and the first operating unit 46A and the second operating unit 46B of the second operating device 36B are used for operating the transmission 16 and is used to change the control state of the controller 52 related to the motor 18. The second rotary body 30 includes, for example, twelve rear sprockets 30A like the second embodiment.

Table 5 shows examples of the transmission stage SF of the front derailleur 16A and the transmission stage SR of the rear derailleur 16B corresponding to the first state which are stored in the storage 54 and the transmission stage SF of the front derailleur 16A and the transmission stage SR of the rear derailleur 16B which correspond to the second state. It is preferable that the storage 54 changeably store a combination of the transmission stage S and the transmission stage SR corresponding to the first state and a combination of the transmission stage S and the transmission stage SR corresponding to the second state. In a case where the information of Table 5 is stored in the storage 54, the controller 52 is in the first control state in which the transmission stage SF of the front derailleur 16A is the first transmission stage SF1 and the transmission stage SR of the rear derailleur 16B is any one of the first to seventh transmission stages SR1 to SR7, and the second control state in which the transmission stage S of the front derailleur 16A is the first transmission stage SF1 and the transmission stage SR of the rear derailleur 16B is any one of the eighth to eleventh transmission stages SR8 to SR11. In a case where the information of Table 4 is stored in the storage 54, the controller 52 is in the first control state in which the transmission stage S of the front derailleur 16A is the second transmission stage SF2 and the transmission stage SR of the rear derailleur 16B is any one of the first to tenth transmission stages SR1 to SR10, and the second control state in which the transmission stage S of the front derailleur 16A is the second transmission stage SF2 and the transmission stage SR of the rear derailleur 16B is any one of the eleventh transmission stage SR11 or the twelfth transmission stages SR12.

TABLE 5

| State | Front derailleur | Rear derailleur |
| --- | --- | --- |
| First state | First transmission stage SF1 | First transmission stage SR1 |
| | | Second transmission stage SR2 |
| | | Third transmission stage SR3 |
| | | Fourth transmission stage SR4 |
| | | Fifth transmission stage SR5 |
| | | Sixth transmission stage SR6 |
| | | Seventh transmission stage SR7 |
| | Second transmission stage SF2 | First transmission stage SR1 |
| | | Second transmission stage SR2 |
| | | Third transmission stage SR3 |
| | | Fourth transmission stage SR4 |
| | | Fifth transmission stage SR5 |
| | | Sixth transmission stage SR6 |
| | | Seventh transmission stage SR7 |
| | | Eighth transmission stage SR8 |
| | | Ninth transmission stage SR9 |
| | | Tenth transmission stage SR10 |
| Second state | First transmission stage SF1 | Eighth transmission stage SR8 |
| | | Ninth transmission stage SR9 |
| | | Tenth transmission stage SR10 |
| | | Eleventh transmission stage SR11 |
| | | Twelfth transmission stage SR12 |
| | Second transmission stage SF2 | Eleventh transmission stage SR11 |
| | | Twelfth transmission stage SR12 |

Fourth Embodiment

In the first embodiment, the storage 54 can changeably store a combination of each of the first state and the second state with the first control state or the second control state. The combination of each of the first state and the second state and the first control state or the second control state stored in the storage 54 can be changed by an external device P. The controller 52 is operated in the first control state or the second control state which is respectively combined with the first state and the second state stored in the storage 54. The controller 52 selects one of the combinations according to the operation of the operating device 36, controls the transmission 16 so as to be in the first state or the second state in the selected combination, and is operated in the first control state or the second control state in the selected combination.

Tables 6 and 7 show examples of combinations of the transmission stage S stored in the storage 54 with the first control state or the second control state. In Table 6, the first control state is associated with the second transmission stage SF2, and the second control state is associated with the first transmission stage SF1. In a case where the information of Table 6 is stored in the storage 54, the controller 52 is in the first control state in a case where the transmission stage S is the second transmission stage SF2, and is in the second control state in a case where the transmission stage S is the first transmission stage SF1. In Table 7, the first control state is associated with the first transmission stage SF1, and the second control state is associated with the second transmission stage SF2. In a case where the information of Table 7 is stored in the storage 54, the controller 52 is in the second control state in a case where the transmission stage S is the second transmission stage SF2, and is in the first control state in a case where the transmission stage S is the first transmission stage SF1.

TABLE 6

| Number | Transmission stage S | Control state of controller |
|---|---|---|
| 1 | Second transmission stage SF2 | First control state |
| 2 | First transmission stage SF1 | Second control state |

TABLE 7

| Number | Transmission stage S | Control state of controller |
|---|---|---|
| 1 | First transmission stage SF1 | First control state |
| 2 | Second transmission stage SF2 | Second control state |

In a case where the controller 52 controls the transmission 16 and the motor 18 by using the information of Table 6 or Table 7, the operating unit 46 of the operating device 36 is associated with the combination of the transmission stage S of the transmission 16 with the control state of the controller 52 related to the motor 18. The storage 54 changeably stores the combination of the operating unit 46 of the operating device 36 with the control state of the controller 52 related to the transmission stage S of the transmission 16 and the motor 18. The combination of the operating unit 46 of the operating device 36 with the control state of the controller 52 related to the transmission stage S of the transmission 16 and the motor 18 can be changed by the external device P.

TABLE 8

| Operating unit | Combination number |
|---|---|
| First operating unit of second operating device | 1 |
| Second operating unit of second operating device | 2 |

In Table 7, for example, a combination of No. 1 is associated with the first operating unit 46A of the second operating device 36B, and the second operating unit 46B of the operating device 36. If the first operating unit 46A of the second operating device 36B is operated to receive an output signal corresponding to the first operating unit 46A, then the controller 52 controls the transmission 16 so that the front derailleur 16A becomes the first transmission stage SF1 and is in the first control state. If the second operating unit 46B of the second operating device 36B is operated to receive an output signal corresponding to the second operating unit 46B, then the controller 52 controls the transmission 16 so that the front derailleur 16A becomes the second transmission stage SF2 and is in the second control state.

Fifth Embodiment

In the fourth embodiment, only one of the combinations of the transmission stage S of the transmission 16 with the control state of the controller 52 related to the motor 18 is associated with one operating unit 46. In a fifth embodiment, a plurality of combinations of a transmission stage S of a transmission 16 with a control state of a controller 52 related to a motor 18 are associated with one operating unit 46. The storage 54 changeably stores the combination of the transmission stage S of the transmission 16 corresponding to an operating unit 46 with the control state of the controller 52 related to the motor 18. The combination of the transmission stage S of the transmission 16 corresponding to the operating unit 46 with the control state of the controller 52 related to the motor 18 can be changed by an external device P. Table 9 shows an example of the combination of the transmission stage S of the transmission 16 corresponding to the operating unit 46 with the control state of the controller 52 related to the motor 18. In Table 9, combinations of the first operating unit 46A of the second operating device 36B with No. 1 and No. 2 are associated with each other.

TABLE 9

| Operating unit | Combination Number |
|---|---|
| First operating unit of second operating device | 1, 2 |

Whenever the operating device 36 is operated, the controller 52 switches the transmission stage S of the transmission 16 and the control state of the controller 52 related to the motor 18 to a state of combination No. 1 and a state of combination No. 2.

Tables 10 and 11 show another example of a combination of one of a ratio R and the transmission stage S stored in the storage 54 with a first control state or a second control state. The examples of Tables 10 and 11 include a state in which one of one ratio R and the transmission stage S acquires both the first control state and the second control state. In a case of controlling the transmission 16 and the motor 18 using Table 10 or Table 11, the controller 52 controls the transmission 16 and the motor 18 to combine the transmission stage S of the transmission 16 with the control state of the controller 52 related to the motor 18 in order from a large combination number and an order of a small combination number whenever one operating unit 46 of the operating device 36 is operated. The combination number is changeably stored in storage 54 and can be changed by the external device P.

TABLE 10

| Number | Transmission stage S | Control state of controller |
|---|---|---|
| 1 | Second transmission stage SF2 | First control state |
| 2 | Second transmission stage SF2 | Second control state |
| 3 | First transmission stage SF1 | Second control state |

TABLE 11

| Number | Transmission stage S | Control state of controller |
|---|---|---|
| 1 | Second transmission stage SF2 | First control state |
| 2 | First transmission stage SF1 | Second control state |
| 3 | First transmission stage SF1 | Second control state |

The storage 54 can store tables of the combinations of one of the rotational speed ratios R and the transmission stages S with the first control state or the second control state as shown in Tables 6, 7, 10, and 11. In this case, it is preferable that the operating device 36 be provided with an operating unit for selecting a table. When the operating unit for selecting the table is operated, the controller 52 changes the table used for the control. For example, in a case where the storage 54 stores two tables as shown in Tables 10 and 11, the controller 52 sequentially switches the tables whenever the operating unit for selecting the table is operated. In a case where there are three or more tables, it is preferable that the controller 52 switch the tables used for control in accordance with an order determined in advance. In a case where one of the operating units for selecting the table is operated, the controller 52 can be configured to select one of the relationships between one of the plurality of ratios R and transmission stages S and the control state of the controller 52 related to the motor 18 to control the transmission 16 and the motor 18 according to the selected relationship.

For example, the combination of the transmission stage SF of the front derailleur 16A with the control state of the controller 52 related to the motor 18 can be selected from four combinations shown in Table 12.

TABLE 12

| Number | Transmission stage | Control state of controller |
|---|---|---|
| 1 | Second transmission stage SF2 | First control state |
| 2 | First transmission stage SF1 | Second control state |
| 3 | Second transmission stage SF2 | Second control state |
| 4 | First transmission stage SF1 | First control state |

In a case where three or more combinations of the transmission stage S of the transmission 16 with the control state of the controller 52 of the motor 18 are associated with one operating unit 46, the controller 52 switches the combination of the transmission stage S of the transmission 16 with the control state of the controller 52 related to the motor 18 in order from a large combination number or in order from a small combination number whenever the operating device 36 is operated. The combination number is changeably stored in the storage 54 and can be changed by the external device P.

In the first to fifth embodiments, in a case where one of the rotational speed ratio R and the transmission stage S has changed from the first state to the second state, it is preferable that the controller 52 operate the transmission 16 decreasing the output of the motor 18. In a case where one of the rotational speed ratio R and the transmission stage S has changed from the second state to the first state, the controller 52 switches the motor 18 from the second control state to the first control state after operating the transmission 16.

In the first to fifth embodiments, in at least one of a case in which one of the rotational speed ratio R and the transmission stage S has changed from the first state to the second state and a case in which one of the rotational speed ratio R and the transmission stage S has changed from the second state to the first state, the controller 52 can be configured to control the motor 18 so that an output torque TM of the motor 18 becomes smaller than or equal to a predetermined value TMX over a predetermined period L. The at least one of a case in which one of the rotational speed ratio R and the transmission stage S has changed from the first state to the second state and a case in which one of the rotational speed ratio R and the transmission stage S has changed from the second state to the first state includes only the case in which one of the rotational speed ratio R and the transmission stage S has changed from the first state to the second state and the case in which one of the rotational speed ratio R, only the case in which the transmission stage S has changed from the second state to the first state, both the case in which one of the rotational speed ratio R and the transmission stage S has changed from the first state to the second state and the case in which one of the rotational speed ratio R and the transmission stage S has changed from the second state to the first state. The predetermined period L includes at least part of a period in which the transmission 16 performs the change operation of the rotational speed ratio R and the transmission stage S. It is preferable that the predetermined period L include the whole period in which the transmission 16 performs the change operation of the rotational speed ratio R and the transmission stage S.

In the first to fifth embodiments, in at least one of a case in which one of the rotational speed ratio R and the transmission stage S has changed from the first state to the second state and a case in which one of the rotational speed ratio R and the transmission stage S has changed from the second state to the first state, the controller 52 can be configured to control the motor 18 so that the output torque TM of the motor 18 becomes smaller than or equal to the predetermined value TMX before the shifting by the transmission 16 is completed. The at least one of the case in which one of the rotational speed ratio R and the transmission stage S has changed from the first state to the second state and the case in which one of the rotational speed ratio R and the transmission stage S has changed from the second state to the first state includes only the case in which one of the rotational speed ratio R and the transmission stage S has changed from the first state to the second state, only the case in which one of the rotational speed ratio R and the transmission stage S has changed from the second state to the first state, or both the case in which one of the rotational speed ratio R and the transmission stage S has changed from the first state to the second state and the case in which one of the rotational speed ratio R and the transmission stage S has changed from the second state to the first state. In the first to fifth embodiments, in both the case in which one of the rotational speed ratio R and the transmission stage S has changed from the first state to the second state and the case in which one of the rotational speed ratio R and the transmission stage S has changed from the second state to the first state, the controller 52 can be configured to control the motor 18 so that the output torque TM of the motor 18 becomes smaller than or equal to the predetermined value TMX before the shifting by the transmission 16 is completed. It is preferable that the predetermined value TMX be 0.

Figure 4:
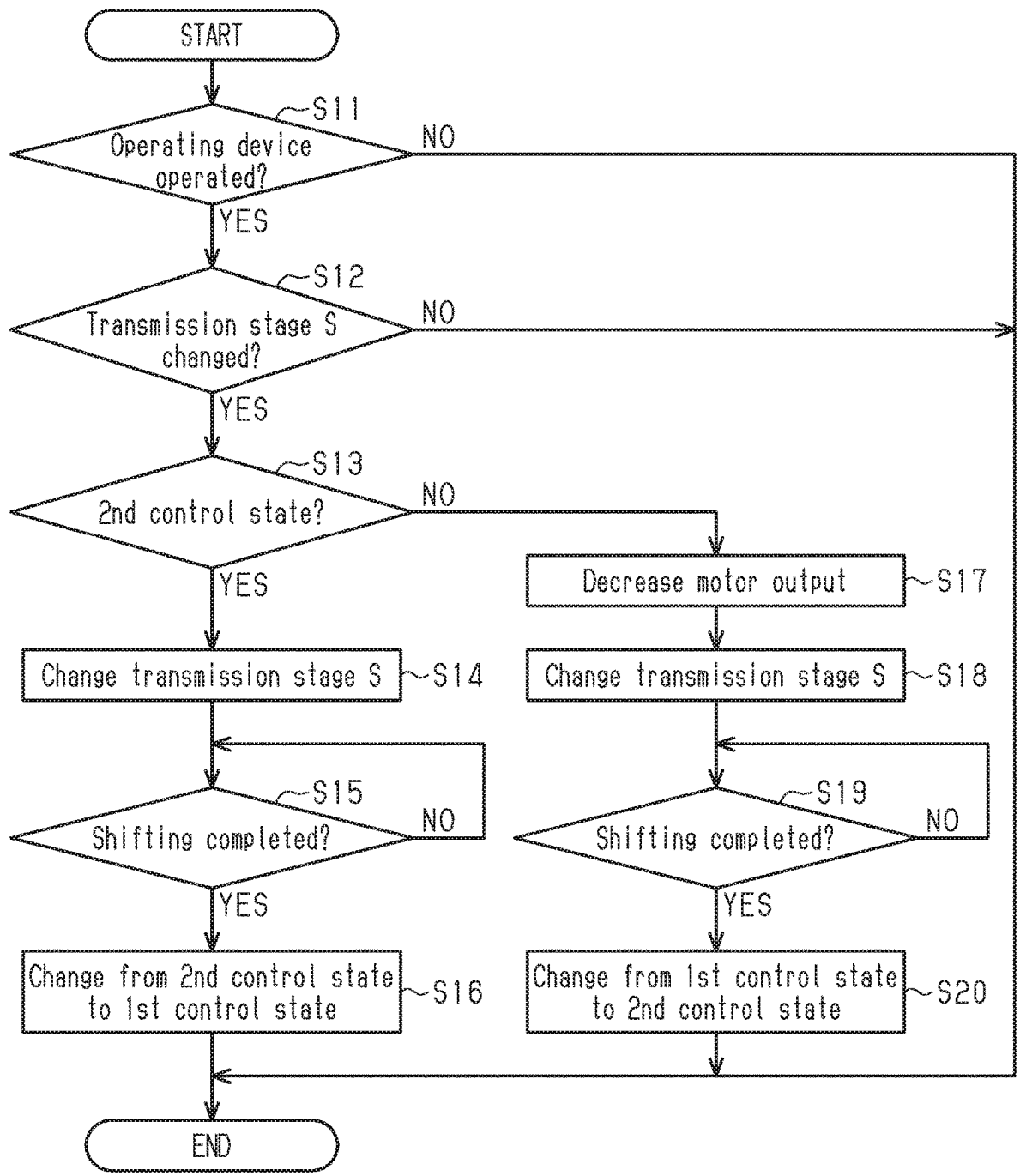
FIG. 4 is a flowchart of a process of switching a ratio and a control state of an electronic controller related to a motor executed by the electronic controller of FIG. 2.

A process of changing the control state of the controller 52 related to the motor 18 and the transmission stage S in the fifth embodiment will be described with reference to FIG. 4. If electric power is supplied from a battery 38 to the controller 52, then the controller 52 starts the processing and the processing proceeds to step S11 of the flowchart shown in FIG. 4. As long as electric power is supplied, the controller 52 executes processing from step S11 every predetermined period. In the fifth embodiment, a state in which the combination of the transmission stage S of the transmission 16 with the control state of the controller 52 related to the motor 18 has changed by the first operating unit 46A of the operating device 36 will be described.

In step S11, the controller 52 determines whether or not the operating device 36 has been operated. Specifically, the controller 52 determines whether or not the first operating unit 46A has been operated. In a case where the controller 52 determines the first operating unit 46A has not been operated, the processing ends. In a case where the controller 52 determines that the first operating unit 46A has been operated, the processing proceeds to step S12.

In step S12, the controller 52 determines whether or not to change the transmission stage S. Specifically, in a case where the transmission stage S of the combination selected according to the operation of the operating device 36 does not coincide with a present transmission stage S, the controller 52 determines that it is necessary to change the transmission stage S. In a case where the transmission stage S of the combination selected according to the operation of the operating device 36 coincides with the present transmission stage S, the controller 52 determines that it is not necessary to change the transmission stage S. In a case where the controller 52 determines that it is not necessary to change the transmission stage S, the processing ends. In a case where the controller 52 determines that it is necessary to change the transmission stage S, the processing proceeds to step S13.

In step S13, the controller 52 determines whether or not the present control state is in the second control state. In a case where the controller 52 determines that the present control state is in the second control state, the processing proceeds to step S14 to change the transmission stage S and proceeds to step S15. In step S14, the controller 52 controls an actuator 32 to start the shifting operation of the transmission 16.

In step S15, the controller 52 determines whether or not the shifting has been completed. The controller 52 determines whether or not the shifting has been completed from an output of the detector 56. The controller 52 repeats step S15 until the shifting is completed. In a case where the controller 52 determines that the shifting has not been completed, the processing proceeds to step S16. In step S16, the controller 52 changes the control state of the controller 52 related to the motor 18 from the second control state to the first control state, and the processing ends. In the period from step S14 to step S16, since the controller 52 related to the motor 18 is in the second control state, the shifting is suitably performed.

In a case where the controller 52 determines in step S13 that the present control state is not in the second control state, the processing proceeds to step S17. In step S17, the controller 52 decreases the output of the motor 18 and the processing proceeds to step S18. Specifically, the controller 52 controls the motor 18 so that the output torque TM of the motor 18 becomes smaller than or equal to the predetermined value TMX. In step S18, the controller 52 controls the actuator 32 to start the shifting operation of the transmission 16.

In step S19, the controller 52 determines whether or not the shifting has been completed. The controller 52 determines whether or not the shifting has been completed from an output of the detector 56. The controller 52 repeats step S19 until the shifting is completed. In a case where the controller 52 determines that the shifting has been completed, the processing proceeds to step S20. In step S20, the controller 52 changes the control state of the controller 52 related to the motor 18 from the first control state to the second control state, and the processing ends. In the period from step S18 to step S20, since the output of the motor 18 is decreased, the shifting is suitably performed. In step S17, the controller 52 can be configured to change the control state of the controller 52 related to the motor 18 from the first control state to the second control state. In this case, step S20 can be omitted.

Sixth Embodiment

Figure 5:
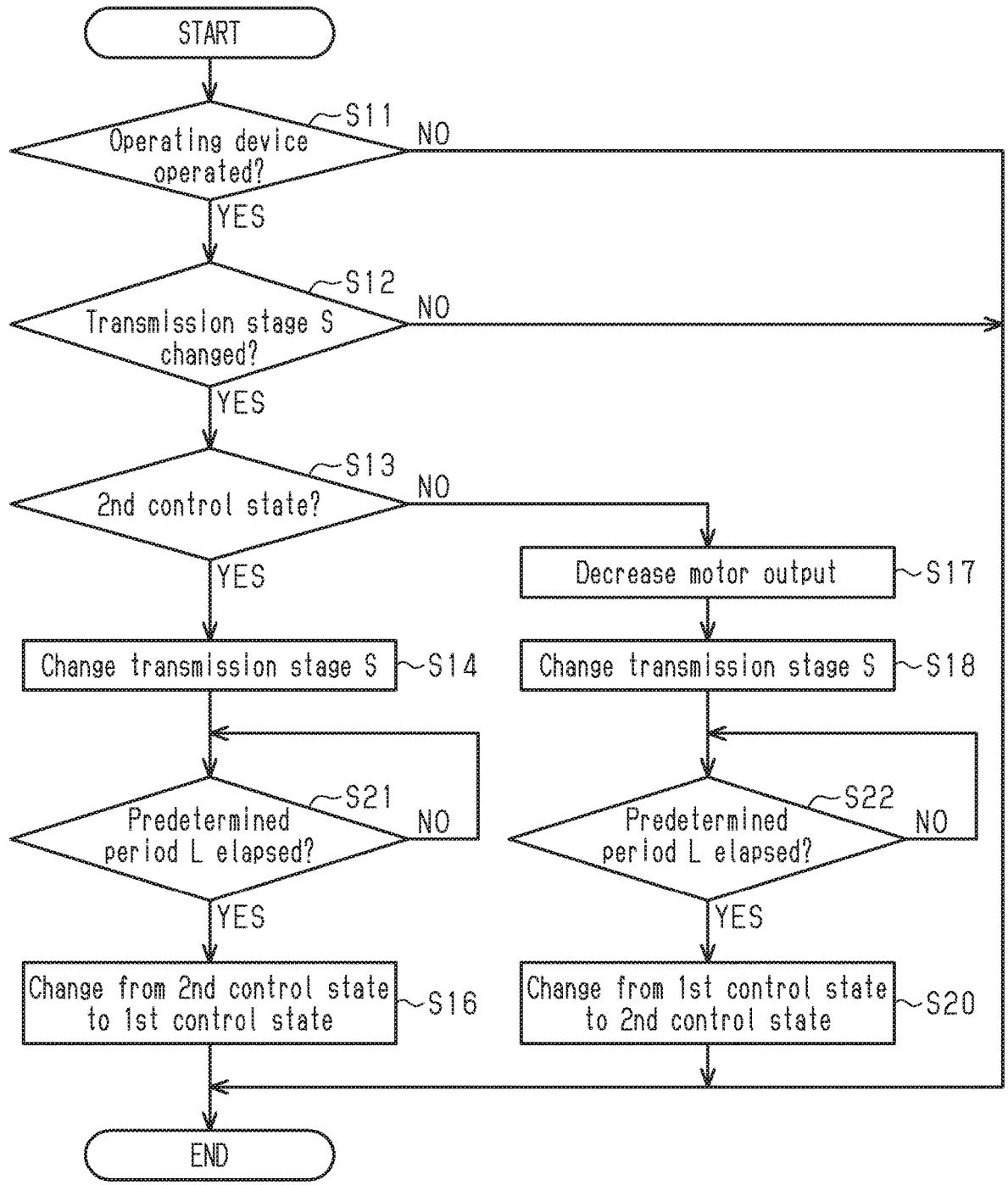
FIG. 5 is a flowchart of a process of switching a state of a human-powered vehicle component and the control state of the motor executed by an electronic controller in accordance with a sixth embodiment.

A control device 50 in accordance with a sixth embodiment will be described with reference to FIG. 5. Since the control device 50 in accordance with the sixth embodiment is the same as the control device 50 in accordance with the fifth embodiment except that processing of FIG. 5 is executed instead of the processing of FIG. 4 in accordance with the fifth embodiment, components common to the fifth embodiment are denoted by the same reference numerals as the fifth embodiment and redundant descriptions thereof are omitted.

Processing of changing the control state of the controller 52 related to the motor 18 and the transmission stage S will be described with reference to FIG. 5. Instead of step S15 of FIG. 4, the controller 52 executes step S21. Instead of step S19 of FIG. 4, the controller 52 executes step S22.

In step S14, if the controller 52 determines that the transmission stage S has changed, then the processing proceeds to step S21. In step S21, the controller 52 determines whether or not a predetermined period L has elapsed. Specifically, the controller 52 determines whether or not the period from the start of the change in the transmission stage S in step S14 has exceeded the predetermined period L. The controller 52 repeats step S21 until the predetermined period L elapses. The controller 52 proceeds to step S16 upon determining the predetermined period L has elapsed.

If the controller 52 determines in step S18 that the transmission stage S has changed, then the processing proceeds to step S22. In step S22, the controller 52 determines whether or not the predetermined period L has elapsed. Specifically, the controller 52 determines whether or not the period from the start of the change in the transmission stage S in step S18 has exceeded the predetermined period L. The controller 52 repeats step S22 until the predetermined period L elapses. The controller 52 proceeds to step S20 upon determining the predetermined period L has elapsed.

Seventh Embodiment

A control device 80 in accordance with a seventh embodiment will be described with reference to FIGS. 6 and 7. Since the control device 80 in accordance with the seventh embodiment is the same as the control device 50 in accordance with the first embodiment except that a controller 52 controls a human-powered vehicle component 72, components common to the first embodiment are denoted by the same reference numerals as the first embodiment and redundant descriptions thereof will be omitted.

Figure 6:
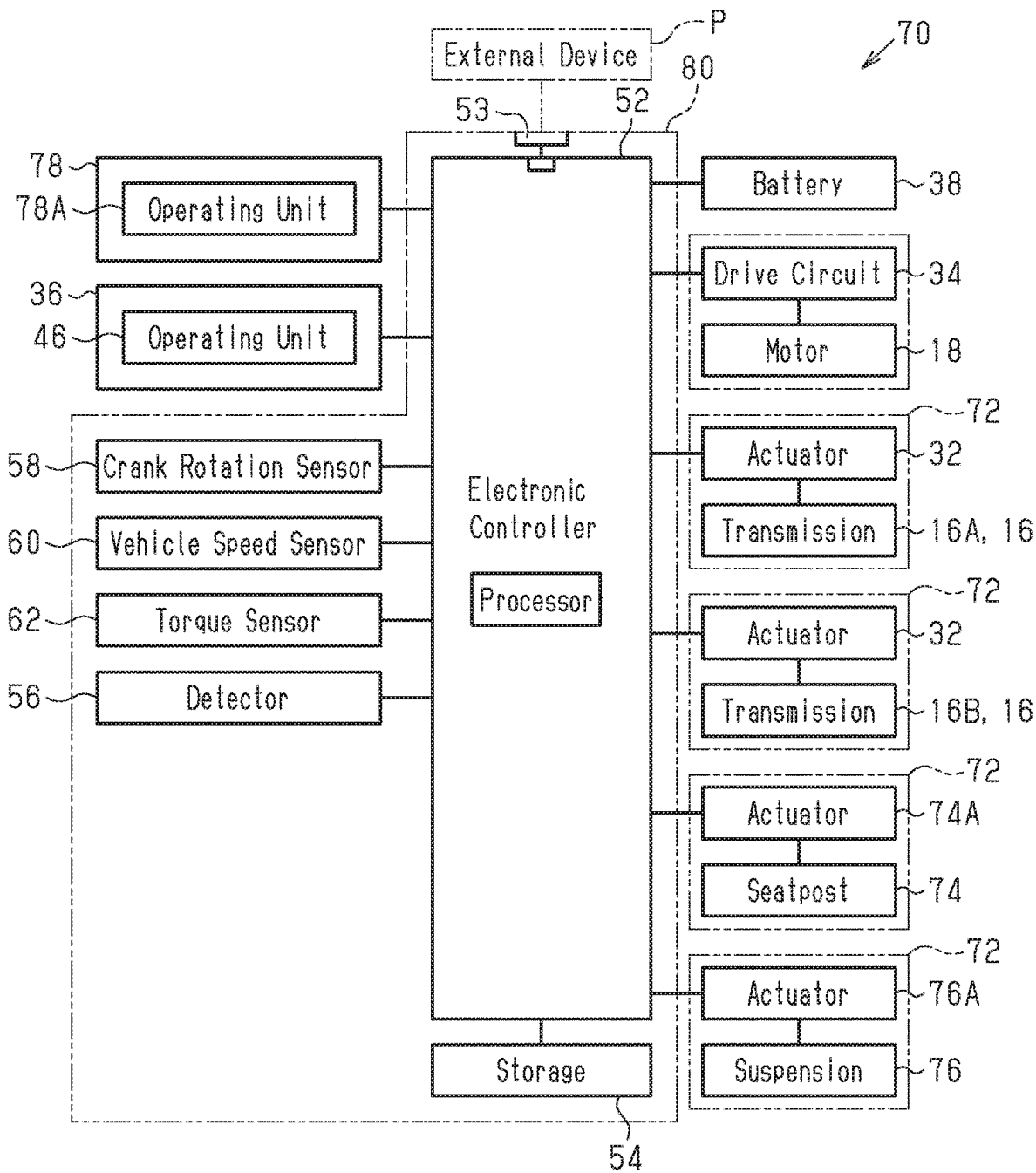
FIG. 6 is a block diagram showing an electrical configuration of a human-powered vehicle control device in accordance with a seventh embodiment.

The control device 80 shown in FIG. 6 is used for a human-powered vehicle 70. The human-powered vehicle 70 includes the human-powered vehicle component 72 and a motor 18. The human-powered vehicle component 72 is changed to a plurality of states. The control device 80 includes a controller 52 controlling the motor 18. The control device 80 further includes the storage 54, the detector 56, the crank rotation sensor 58, the vehicle speed sensor 60, and the torque sensor 62.

The human-powered vehicle component 72 includes at least one of a transmission 16 changing a ratio R, a seatpost 74 of the human-powered vehicle 70, and a suspension 76 of the human-powered vehicle 70. The at least one of a transmission 16 changing a ratio R, a seatpost 74 of the human-powered vehicle 70, and a suspension 76 of the human-powered vehicle 70 includes only the transmission 16 changing a ratio R, only the seatpost 74 of the human-powered vehicle 70, only the suspension 76 of the human-powered vehicle 70, or any combination of the transmission 16 changing a ratio R, the seatpost 74 of the human-powered vehicle 70, and the suspension 76 of the human-powered vehicle 70. Hereinafter, the human-powered vehicle component 72 will be described as the component 72.

In a case where an operating device 36 is operated, as in the fifth embodiment, the controller 52 controls the transmission 16 and the motor 18 so that a state of the transmission 16 and a control state of the controller 52 related to the motor 18 is one of combinations described in Tables based on any one of Tables 6, 7, 10, and 11.

The seatpost 74 includes an actuator 74A configured to change a height of the seatpost 74. The actuator 74A of the seatpost 74 can be configured to control extending of a valve of the seatpost 74 with hydraulic pressure or air. The height of the seatpost 74 differs in the plurality of states. Table 13 shows an example of a combination of the plurality of states of the seatpost 74 with the control state of the controller 52. The storage 54 changeably stores the combination of the state of the seatpost 74 with the control state of the controller 52. The combination of the state of the seatpost 74 with the control state of the controller 52 can be changed by an external device P. In Table 13, a state in which the seatpost 74 becomes equal to or higher than a predetermined height and a first control state are combined, and a state in which the seatpost 74 is lower than the predetermined height and a second control state are combined. The detector 56 is configured to detect information on the height of the seatpost 74. The detector 56 can detect, for example, an operation amount of the actuator 74A or can detect a movement amount of part of the seatpost 74. The controller 52 associates the combination of the state of the seatpost 74 described in Table 13 with the control state of the controller 52 with the operating unit 46. The controller 52 associates a combination of the state of the seatpost 74 of combination No. 1 or 2 with the control state of the controller 52 with one operating unit 46. It is preferable that the operating unit 46, which changes the combination of the state of the seatpost 74 and the control state of the controller 52, include one of first to third operating units 46A, 46B, and 46C. For example, in a case where one of the third operating units 46C of a second operating device 36B is operated, the controller 52 controls the seatpost 74 and the motor 18 so that the state of the seatpost 74 of combination No. 1 described in Table 13 and the control state of the controller 52 are combined. For example, in a case where another of the third operating units 46C of the second operating device 36B is operated, the controller 52 controls the seatpost 74 and the motor 18 so that the state of the seatpost 74 of combination No. 2 described in Table 13 and the control state of the controller 52 are combined.

TABLE 13

| Number | State of seatpost | Control state of controller |
|---|---|---|
| 1 | Equal to higher than predetermined height | First control state |
| 2 | Lower than predetermined height | Second control state |

The suspension 76 includes the actuator 76A configured to change at least one of hardness, a damping rate, and a height of the suspension 76. The at least one of hardness, a damping rate, and a height of the suspension 76 includes only hardness, only the damping rate, only the height of the suspension 76, or any combination of hardness, the damping rate, and the height of the suspension 76. The suspension 76 includes at least one of a front suspension and a rear suspension. The at least one of only the front suspension, only the rear suspension, or both of the front suspension and the rear suspension. At least one of the hardness, damping rate, and length of the suspension 76 of the suspension 76 differs in the plurality of states. Table 14 shows an example of the combination of the plurality of states of the suspension 76 with the control state of the controller 52. The storage 54 changeably stores the combination of the state of the suspension 76 with the control state of the controller 52. The combination of the state of the suspension 76 with the control state of the controller 52 can be changed by the external device P. In Table 14, a state (lockout) where the suspension 76 is hard and the first control state are combined, and a state (lockout release) where the suspension 76 is soft and the second control state are combined. The detector 56 is configured to detect the information on the state of the suspension 76. The detector 56 can detect, for example, an operation amount of the actuator 76A or can detect a movement amount of part of the suspension 76. The controller 52 associates the combination of the state of the suspension 76 described in Table 14 with the control state of the controller 52 with the operating unit 46. The controller 52 associates the combination of the state of the suspension 76 of combination No. 1 or 2 with the control state of the controller 52 with one operating unit 46. The operating unit 46, which is configured to change the combination of the state of the suspension 76 and the control state of the controller 52, is provided in plural. For example, in a case where one of the third operating units 46C of the first operating device 36A is operated, the controller 52 controls the suspension 76 and the motor 18 so that the state of the suspension 76 of combination No. 1 described in Table 14 and the control state of the controller 52 are combined. For example, in a case where another of the third operating units 46C of the second operating device 36B is operated, the controller 52 controls the suspension 76 and the motor 18 so that the state of the suspension 76 of combination No. 2 described in Table 14 and the control state of the controller 52 are combined.

TABLE 14

| Number | State of suspension | Control state of controller |
|---|---|---|
| 1 | Lockout | First control state |
| 2 | Lockout release | Second control state |

It is preferable that the operating unit 46 for operating the transmission 16, the operating unit 46 for operating the seatpost 74, and the operating unit 46 for operating the suspension 76 be separately provided. In a case where at least two of the state of the transmission 16, the state of the seatpost 74, and the state of the suspension 76 are combined with the control state of the controller 52 related to the motor 18, the transmission 16, the seatpost 74, and the operating unit 46 corresponding to the suspension 76 which are included in the combination can be used in common. For example, Table 15 shows an example of a combination of the plurality of states of the seatpost 74, the plurality of states of the suspension 76, and the control state of the controller 52.

TABLE 15

| Number | State of seatpost | State of suspension | Control state of controller |
| --- | --- | --- | --- |
| 1 | Equal to or higher than predetermined height | Lockout | First control state |
| 2 | Lower than predetermined height | Lockout release | Second control state |

The human-powered vehicle 70 can further include an operating device 78 that differs from the operating device 36. The operating device 78 includes a plurality of operating units 78A. The plurality of operating units 78A can be provided on the same housing or be provided on separate housings that are separately attached to the human-powered vehicle 10. The operating device 78 can include a cycle computer having the operating unit 78A. The operating device 78 can include a touch panel. In this case, the operating unit 78A corresponds to the touch panel.

The controller 52 can be configured to associate the combination of the state of the seatpost 74 described in Table 13 with the control state of the controller 52 with the operating unit 78A. In this case, upon determining one of the plurality of operating units 78A is operated, the controller 52 controls the seatpost 74 and the motor 18 so that the state of the seatpost 74 of combination No. 1 described in Table 13 and the control state of the controller 52 are combined. Upon determining another of the plurality of operating units 78A is operated, the controller 52 controls the seatpost 74 and the motor 18 so that the state of the seatpost 74 of combination No. 2 described in Table 13 and the control state of the controller 52 are combined.

The controller 52 can be configured to associate the combination of the state of the suspension 76 described in Table 14 with the control state of the controller 52 with the operating unit 78A. In this case, upon determining another of the plurality of operating units 78A is operated, the controller 52 controls the suspension 76 and the motor 18 so that the state of the suspension 76 of combination No. 1 described in Table 14 and the control state of the controller 52 are combined. For example, in a case where another of the plurality of operating units 78A is operated, the controller 52 controls the suspension 76 and the motor 18 so that the state of the suspension 76 of combination No. 2 described in Table 14 and the control state of the controller 52 are combined.

The controller 52 is configured to switch the first control state and the second control state in accordance with the state of the component 72.

The storage 54 changeably stores the combination of each of the plurality of states of the component 72 with the first control state or the second control state. The combination of each of the plurality of states of the component 72 stored in the storage 54 with the first control state or the second control state can be changed by the external device P. The controller 52 is operated in the first control state or the second control state which is combined with one of the plurality of states of the component 72 stored in the storage 54.

The controller 52 selects one of the combinations of the state of the component 72 with the first control state or the second control state according to at least one of the operating device 36 and the operating device 78, controls the component 72 so as to be in the state of the component 72 in the selected combination, and is operated in the first control state or the second control state in the selected combination. The at least one of the operating device 36 and the operating device 78 includes only the operating device 36, only the operating device 78, or both of the operating device 36 and the operating device 78.

The storage 54 stores the combination of each of the plurality of operating units among the operating units 46 and 78A, the state of the component 72, and the first control state or the second control state in correspondence with each other. If the operating devices 36 and 78 are operated, then the controller 52 selects the combination corresponding to the operating units 46 and 78A operated.

Processing of changing the control state of the controller 52 and the state of the component 72 will be described with reference to FIG. 7. If electric power is supplied from a battery 38 to the controller 52, then the controller 52 starts the processing and the processing proceeds to step S31 of the flowchart shown in FIG. 7. As long as electric power is supplied, the controller 52 executes processing from step S31 every predetermined period.

In step S31, the controller 52 determines whether or not the operating devices 36 and 78, which are configured to change the state of the component 72 and the control state of the controller 52 related to the motor 18, have been operated. In a case where it is determined that one of the operating units 46 and 78A, which are configured to change the state of the component 72 and the control state of the controller 52 related to the motor 18, among the plurality of operating units 46 and 78A of the operating devices 36 and 78 has been operated, the controller 52 determines that the operating devices 36 and 78, which are configured to change the state of the component 72 and the control state of the controller 52 related to the motor 18, have been operated. In a case where the controller 52 determines in step S31 that the operating devices 36 and 78, which are configured to change the state of the component 72 and the control state of the controller 52 related to the motor 18, have not been operated, the processing ends. In a case where the controller 52 determines in step S31 that the operating devices 36 and 78, which are configured to change the state of the component 72 and the control state of the controller 52 related to the motor 18, are operated, the processing proceeds to step S32.

In step S32, the controller 52 selects the combination associated with the operating units 46 and 78A of the operating devices 36 and 78 determined to be operated in step S31, and the processing proceeds to step S33. In step S33, the controller 52 determines whether or not the state of the component 72 of the selected combination differs from the present state. In a case where the controller 52 determines that the state of the component 72 of the selected combination differs from the present state, the processing proceeds to step S34. In step S34, the controller 52 changes the state of the component 72 to the state of the component 72 of the selected combination, and the processing proceeds to step S35. In step S33, in a case where the controller 52 determines that the state of the component 72 of the selected combination does not differ from the present state, the processing proceeds to step S35.

In step S35, the controller 52 determines whether or not the control state of the selected combination differs from the present control state. In a case where the controller 52 determines that the control state of the selected combination differs from the present control state, the processing proceeds to step S36. In step S36, the controller 52 changes the control state to the control state of the selected combination, and the processing ends. If the controller 52 determines in step S36 that the control state of the selected combination does not differ from the present control state, then the processing ends.

The combination of the state of the component 72 and the control state of the controller 52 is stored in the storage 54 for each of the plurality of the components 72, and in a case where the controller 52 performs a control, the controller 52 is in the control state of the combination corresponding to the operating unit that has been operated last.

Eighth Embodiment

A control device 80 in accordance with an eighth embodiment will be described with reference to FIGS. 8 and 9. Since the control device 80 in accordance with the eighth embodiment is the same as the control device 80 in accordance with the seventh embodiment except that processing of FIG. 8 is executed instead of the processing of FIG. 7 in accordance with the seventh embodiment, components common to the seventh embodiment are denoted by the same reference numerals as the seventh embodiment and redundant descriptions thereof are omitted.

Figure 8:
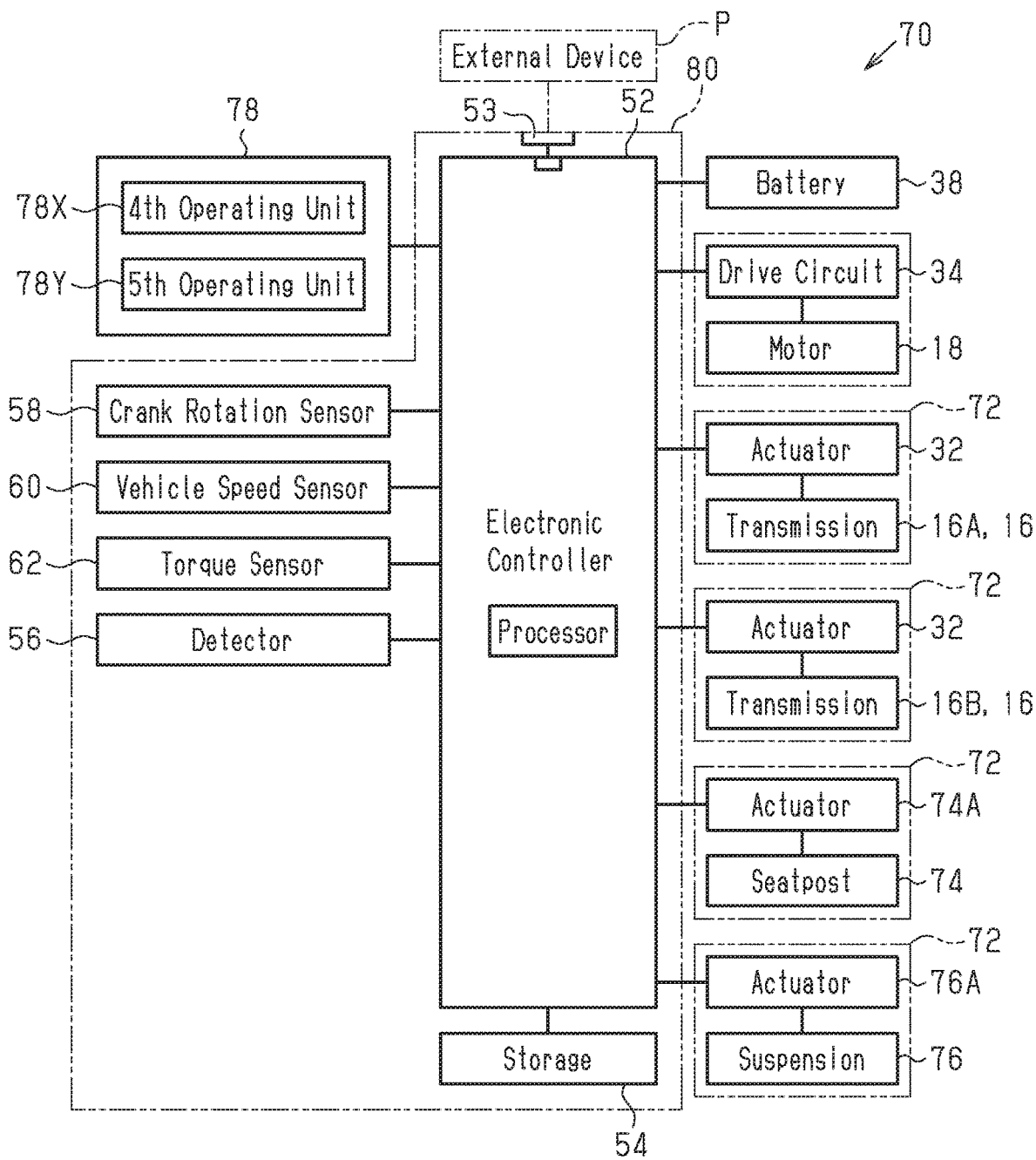
FIG. 8 is a block diagram showing an electrical configuration of a human-powered vehicle control device in accordance with an eighth embodiment.
Figure 9:
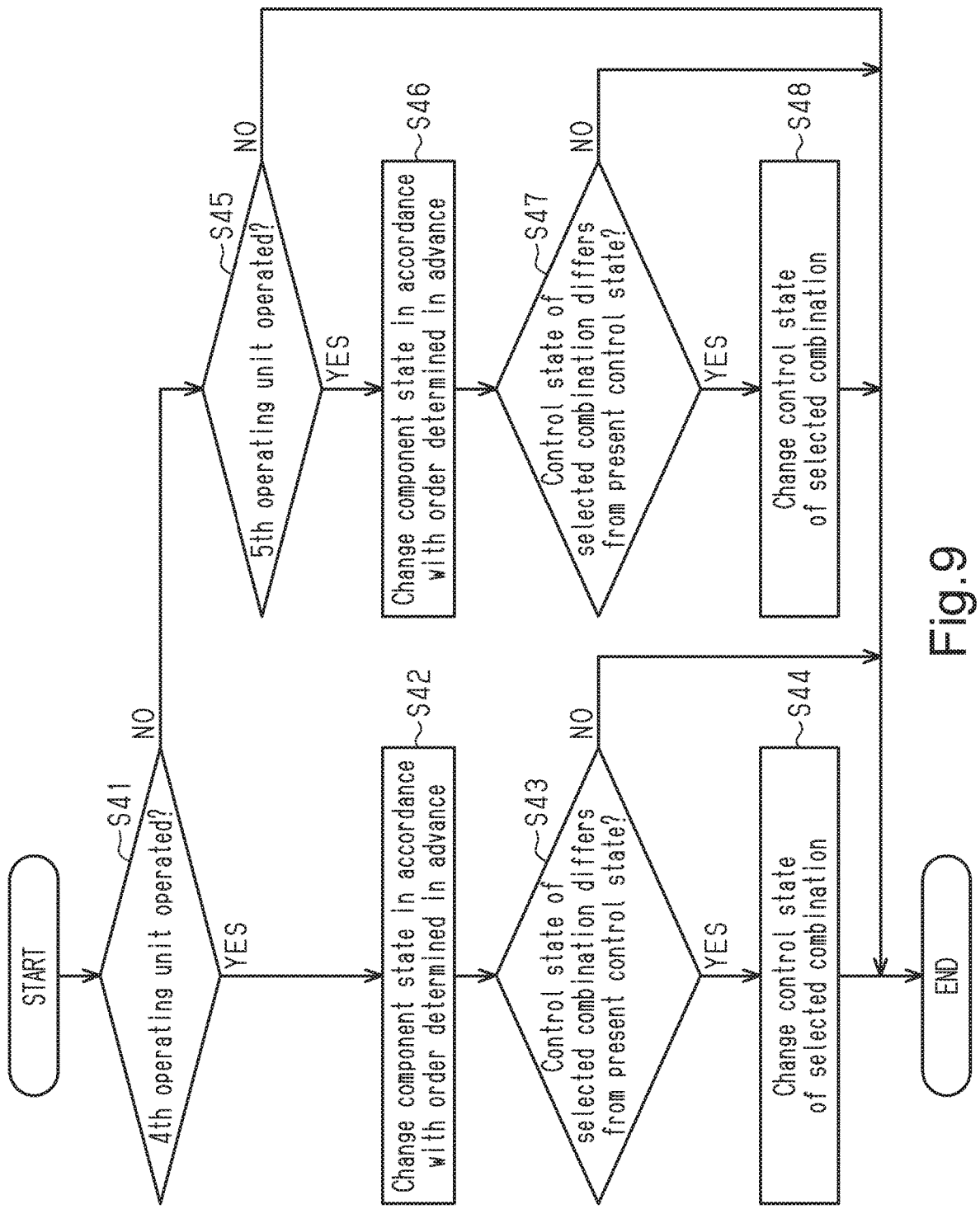
FIG. 9 is a flowchart of a process of switching a state of a human-powered vehicle component and a control state of a motor executed by an electronic controller in accordance with the eighth embodiment.

As shown in FIG. 8, an operating device 78 of a human-powered vehicle 70 includes a fourth operating unit 78X and a fifth operating unit 78Y. The fourth operating unit 78X and the fifth operating unit 78Y can be provided on the same housing or be provided on separate housings that are separately attached to the human-powered vehicle 10. In addition, the fourth operating unit 78X and the fifth operating unit 78Y can be formed by the same operating unit. In this case, an operation in a first operation direction of the operating unit corresponds to an operation of the fourth operating unit 78X, and an operation in a second operation direction corresponds to an operation of the fifth operating unit 78Y.

The controller 52 selects a combination in accordance with an order determined in advance whenever the operating device 78 is operated. For example, if the fourth operating unit 78X is operated, then the controller 52 selects a combination of the component 72, which corresponds to a number greater by 1 than a combination number of the component 72 of which combination number is currently selected with the control state of the controller 52, with the control state of the controller 52 in one of Tables 6, 7, and 10 to 15. If the fifth operating unit 78Y is operated, then the controller 52 selects a combination of the component 72, which corresponds to a combination number smaller by 1 than a combination number of the component 72 of which combination number is currently selected with the control state of the controller 52, with the control state of the controller 52 in one of Tables 6, 7, and 10 to 15.

Processing of changing the control state of the controller 52 and the state of the component 72 will be described with reference to FIG. 9. If electric power is supplied from a battery 38 to the controller 52, then the controller 52 starts the processing and the processing proceeds to step S41 of the flowchart shown in FIG. 9. As long as electric power is supplied, the controller 52 executes processing from step S41 every predetermined period.

In step S41, the controller 52 determines whether or not the fourth operating unit 78X has been operated. In a case where the controller 52 determines that the fourth operating unit 78X is operated, the processing proceeds to step S42. In step S41, the controller 52 changes the state of the component 72 in accordance with an order determined in advance, and the processing proceeds to step S43. For example, the controller 52 selects a combination of the component 72, which corresponds to a combination number greater by 1 than a combination number of the component 72 of which combination number is currently selected with the control state of the controller 52, with the control state of the controller 52 in one of Tables 6, 7, and 10 to 15 and changes the state of the component 72 of the selected combination. In a case where the state of the present component 72 and the state of the selected component 72 coincide with each other, the present state of the component 72 is maintained. In a case where the combination number having the largest combination number is selected in one of Tables 6, 7, and 10 to 15, the controller 52 does not perform steps S42 to S44, and the processing can be ended.

In step S43, the controller 52 determines whether or not the control state of the controller 52 of the selected combination differs from the present control state. In a case where the control state of the selected combination differs from the present control state, in step S44, the controller 52 changes the control state of the selected combination and the processing ends. In a case where the controller 52 determines in step S43 that the control state of the selected combination differs from the present control state, the processing ends.

In a case where the controller 52 determines in step S41 that the fourth operating unit 78X is not operated, the processing proceeds to step S45. In step S45, the controller 52 determines whether or not the fifth operating unit 78Y has been operated. In a case where the controller 52 determines that the fifth operating unit 78Y has been operated, the processing proceeds to step S46. In step S46, the controller 52 changes the state of the component 72 in accordance with an order determined in advance, and the processing proceeds to step S47. For example, the controller 52 selects a combination of the component 72, which corresponds to a number smaller by 1 than a combination number of the component 72 of which number is currently selected with the control state of the controller 52, with the control state of the controller 52 in one of Tables 13 to 15 and changes the state of the component 72 of the selected combination. In a case where the state of the present component 72 and the state of the selected component 72 coincide with each other, the present state of the component 72 is maintained. In a case where the number having the smallest combination number is selected in one of Tables 13 to 15, the controller 52 does not perform steps S45 to S48, and the processing can be ended.

In step S47, the controller 52 determines whether or not the control state of the selected combination differs from the present control state. In a case where the control state of the selected combination differs from the present control state, in step S48, the controller 52 changes the control state of the selected combination and the processing ends. In a case where the controller 52 determines in step S48 that the control state of the selected combination differs from the present control state, the processing ends.

Modified Examples

The description of the above embodiments is an example of a mode that can be taken by a control device according to the present disclosure, and is not intended to limit the embodiments. The control device according to the present disclosure can take a form in which, for example, modified examples of each of the above-described embodiments to be described later and at least two modified examples not contradictory with each other are combined. In the following modified examples, components common to each of the embodiments are denoted by the same reference numerals as the embodiments and the descriptions thereof will be omitted.

In each embodiment, upon determining one of the rotational speed ratio R and the transmission stage S has changed, the controller 52 can be configured to change the control state of the controller 52 associated with one of the rotational speed ratio R and the transmission stage S. Upon determining the state of the component 72 has changed, the controller 52 can be configured to change the control state of the controller 52 associated with the state of the component 72. In this case, the transmission 16, the component 72, the seatpost 74, and the suspension 76 can be configured not to be electrically controlled by the controller 52, but to be operated by an operating force of a user via a Bowden cable. In this case, if it is determined that one of the rotational speed ratio R and the transmission stage S has changed according to the output of the detector 56, then the controller 52 changes the control state of the controller 52 associated with one of the rotational speed ratio R and the transmission stage S. The detector 56 can include a configuration for detecting a movement of the Bowden cable for operating the transmission 16, and can include a configuration for detecting a movement of an operating member of the operating device connected to the transmission 16 via the Bowden cable. The detector 56 can include a configuration for detecting the movement of the Bowden cable for operating the seatpost 74, and can include a configuration for detecting the movement of the operating member connected to the seatpost 74 via the Bowden cable. The detector 56 can include a configuration for detecting the movement of the Bowden cable for operating the suspension 76, and can include a configuration for detecting the movement of the operating member connected to the suspension 76 via the Bowden cable.

Figure 7:
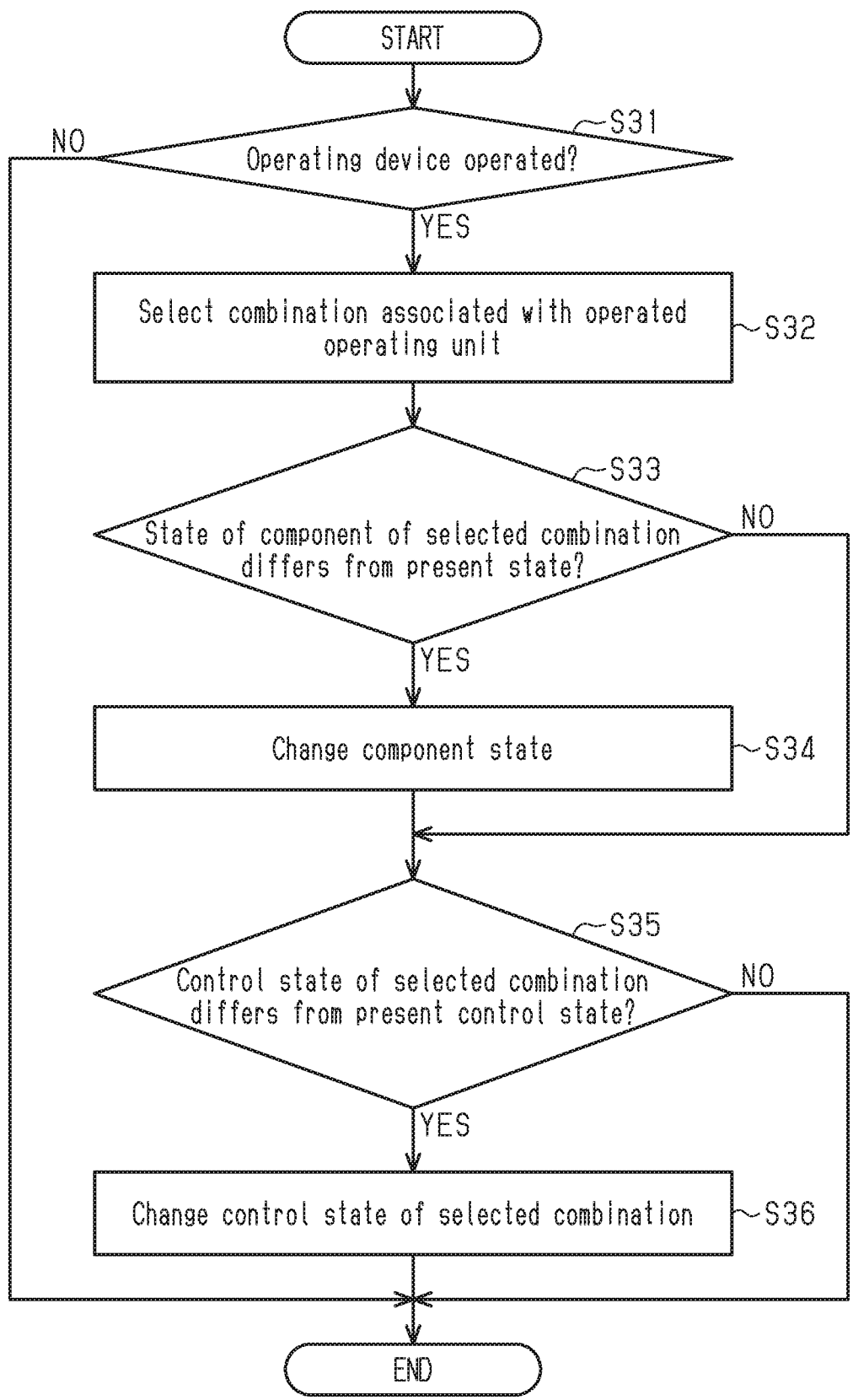
FIG. 7 is a flowchart of a process of switching a state of a human-powered vehicle component and a control state of an electronic controller related to a motor executed by the electronic controller in accordance with the seventh embodiment.

In the embodiment of FIG. 7 and its modified example, a combination of the state of the seatpost 74 having combination Nos. 1 and 2 with the control state of the controller 52 is associated with one of the plurality of operating units 46 and 78A. In a case where the combination of the state of the seatpost 74 of combination Nos. 1 and 2 with the control state of the controller 52 is associated with one operating unit, whenever the operating unit 46 and 78A are operated, the controller 52 switches the combination of the state of the seatpost 74 with the control state of the controller 52 related to the motor 18.

In the embodiment of FIG. 7 and its modified example, a combination of the state of the suspension 76 having combination Nos. 1 and 2 with the control state of the controller 52 is associated with one operating units 46 and 78A of the plurality of operating units 46 and 78A. In a case where the combination of the state of the suspension 76 of combination Nos. 1 and 2 with the control state of the controller 52 is associated with one of the operating units 46 and 78A, whenever the operating units 46 and 78A are operated, the controller 52 switches the combination of the state of the suspension 76 with the control state of the controller 52 related to the motor 18.

In each embodiment and modified examples thereof, the rotational speed ratio R can be used in place of the transmission stage S. For example, the transmission stage S of Tables 2 to 7 and 10 to 12 can be replaced with the rotational speed ratio R. For example, in a case where the first rotary body 26 and the second rotary body 30 each include a plurality of sprockets 26A and 30A, in order to perform the same control as in a case of Table 2 by using the rotational speed ratio R, a plurality of rotational speed ratios R need to be associated with each other in the first state. The plurality of rotational speed ratios R associated with the first state can be calculated based on the number of teeth of the second sprocket 26B and the number of teeth of each of the plurality of rear sprockets 30A. For example, in order to perform the same control as in a case of Table 5 by using the rotational speed ratio R, a combination of one of the plurality of transmission stages SF of the front derailleur 16A and one of the plurality of transmission stages SR of the rear derailleur 16B can be replaced with one rotational speed ratio R. In a case where the transmission 16 includes the front derailleur 16A and the rear derailleur 16B as in the first embodiment, the detector 56 detects each of the transmission stages S of the front derailleur 16A and the rear derailleur 16B. The number of teeth of the gear in each transmission stage S is stored in the storage 54. The controller 52 can calculate the rotational speed ratio R based on the transmission stage S of the front derailleur 16A and the rear derailleur 16B detected by the detector 56 and the information on the number of teeth of the gear corresponding to each transmission stage S stored in the storage 54. The detector 56 can detect the rotational speed ratio R from the rotational speed of the crank detected by the crank rotation sensor 58 and the rotational speed of the wheel detected by the vehicle speed sensor 60.

In each embodiment and modified examples thereof, at least one of the front derailleur 16A and the rear derailleur 16B can be changed to an internal transmission, and in addition to the front derailleur 16A and the rear derailleur 16B, the internal transmission can be provided on the human-powered vehicle 10, and one of the front derailleur 16A and the rear derailleur 16B can be omitted, and the other of the front derailleur 16A and the rear derailleur 16B can be changed to the internal transmission. The internal transmission can be provided, for example, in a hub of the rear wheel or can be provided in the transmission path of the human driving force from the crankshaft 12A to the first rotary body 26.

In each embodiment and its modified example, in a case where one of the ratio R and the transmission stage S is in the second state, the controller 52 can perform regenerative braking on the motor 18. In this case, it is preferable that the motor 18 be provided on the front wheel or the rear wheel.

What is claimed is:

1. A human-powered vehicle control device for a human-powered vehicle including an input rotary body to which a human driving force is input, a driving wheel driven by rotating the input rotary body, a transmission configured to change a rotational speed ratio of a rotational speed of the driving wheel to a rotational speed of the input rotary body, and a motor that assists in propulsion of the human-powered vehicle, the human-powered vehicle control device comprising:

an electronic controller configured to control the motor, the electronic controller being configured to
control the motor in accordance with the human driving force upon determining one of the rotational speed ratio and a transmission stage of the transmission is in a first state, and stop controlling the motor in accordance with the human driving force upon determining one of the rotational speed ratio and the transmission stage is in a second state that is different from the first state.

2. The human-powered vehicle control device according to claim 1, wherein
the electronic controller is configured to stop the motor upon determining one of the rotational speed ratio and the transmission stage is in the second state.

3. The human-powered vehicle control device according to claim 1, wherein
the electronic controller is configured to control the transmission, and
the electronic controller is configured to operate the transmission to decrease an output of the motor upon determining one of the rotational speed ratio and the transmission stage has changed from the first state to the second state.

4. The human-powered vehicle control device according to claim 1, wherein
the electronic controller is configured to control the motor so that an output torque of the motor is smaller than or equal to a predetermined value over a predetermined period that includes at least part of a period in which the transmission performs a change operation of the ratio and the transmission stage upon determining in at least one of a case in which at least one of the rotational speed ratio and the transmission stage has changed from the first state to the second state, and a case in which at least one of the rotational speed ratio and the transmission stage has changed from the second state to the first state.

5. The human-powered vehicle control device according to claim 1, wherein
the electronic controller is configured to control the motor so that the output torque of the motor becomes smaller than or equal to the predetermined value before the shifting by the transmission is completed upon determining in at least one of a case in which at least one of the rotational speed ratio and the transmission stage has changed from the first state to the second state, and a case in which at least one of the rotational speed ratio and the transmission stage has changed from the second state to the first state.

6. The human-powered vehicle control device according to claim 1, further comprising:
a storage configured to changeably store one of the rotational speed ratio and the transmission stage corresponding to the first state and one of the rotational speed ratio and the transmission stage corresponding to the second state,
the electronic controller is further configured to control the motor in accordance with the first state and the second state stored in the storage.

7. The human-powered vehicle control device according to claim 1, wherein
the transmission includes a front derailleur.

8. The human-powered vehicle control device according to claim 1, further comprising
a detector configured to detect one of the rotational speed ratio and the transmission stage corresponding to the first state.

9. A human-powered vehicle control device for a human-powered vehicle including a human-powered vehicle component, which is changed to a plurality of states, and a motor, which assists in propulsion of the human-powered vehicle, the human-powered vehicle control device comprising:
an electronic controller configured to control the motor, the controller being configured to
switch a first control state in which the motor is controlled in accordance with a human driving force input to the human-powered vehicle and a second control state in which control of the motor is stopped in accordance with the human driving force, and
switch the first control state and the second control state in accordance with the state of the human-powered vehicle component, the human-powered vehicle component including at least one of a transmission, a seatpost and a suspension.

10. The human-powered vehicle control device according to claim 9, further comprising
a storage configured to changeably store combinations of each of the plurality of states of the human-powered vehicle component with the first control state or the second control state,
the electronic controller being further configured to be operated in the first control state or the second control state combined with one of the plurality of states of the human-powered vehicle component stored in the storage.

11. The human-powered vehicle control device according to claim 9, wherein
the human-powered vehicle component includes the transmission, the transmission being configured to change a rotational speed ratio of a rotational speed of a driving wheel driven by rotating an input rotary body to a rotational speed of the input rotary body input to which the human driving force is input, and
a transmission stage of the transmission differs in the plurality of states.

12. The human-powered vehicle control device according to claim 9, wherein
the human-powered vehicle component includes the seatpost of the human-powered vehicle, and
a height of the seatpost differs in the plurality of states.

13. The human-powered vehicle control device according to claim 9, wherein
the human-powered vehicle component includes the suspension of the human-powered vehicle, and
at least one of a hardness, a damping factor, and a length of the suspension differs in the plurality of states.

14. A human-powered vehicle control device for a human-powered vehicle including a human-powered vehicle component, which is changed to a plurality of states, and a motor, which assists in propulsion of the human-powered vehicle including the human-powered vehicle component, the human-powered vehicle control device comprising:
an electronic controller configured to control the human-powered vehicle component and the motor; and
a storage,
the electronic controller being configured to switch a first control state in which the motor is controlled in accordance with a human driving force input to the human-powered vehicle and a second control state in which a control of the motor in accordance with the human driving force is stopped;
the storage being configured to changeably store combinations of each of the plurality of states of the human-powered vehicle component with the first control state or the second control state; and the electronic controller being configured to select one of the combinations in accordance with an operation of an operating device, control the human-powered vehicle component so that the human-powered vehicle component is in a state of the selected combination, and so that the human-powered vehicle component is operated in the first control state or the second control state in the selected combination.

15. The human-powered vehicle control device according to claim 14, wherein the electronic controller is configured to select combinations in accordance with an order determined in advance whenever the operating device is operated.

16. The human-powered vehicle control device according to claim 15, wherein the operating device includes a plurality of operating units, the storage stores each of the plurality of operating units and the combinations in correspondence with each other, and the electronic controller is configured to select the combinations corresponding to the operating units operated upon determining the operating device is operated.

* * * * *